(12) United States Patent
Zhu

(10) Patent No.: US 6,636,212 B1
(45) Date of Patent: Oct. 21, 2003

(54) METHOD AND APPARATUS FOR DETERMINING VISIBILITY OF GROUPS OF PIXELS

(75) Inventor: Benjamin M. Zhu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 332 days.

(21) Appl. No.: 09/713,474

(22) Filed: Nov. 14, 2000

(51) Int. Cl.[7] .............................................. G06T 15/00
(52) U.S. Cl. ...................................................... 345/421
(58) Field of Search ................................ 345/419, 420, 345/421, 422, 423, 620, 622, 624, 625, 634, 637

(56) References Cited

U.S. PATENT DOCUMENTS

| | | | |
|---|---|---|---|
| 4,679,041 A | 7/1987 | Fetter et al. ................. | 340/747 |
| 5,509,110 A | 4/1996 | Latham ....................... | 395/121 |
| 5,579,455 A | 11/1996 | Greene et al. ............... | 395/122 |
| 5,583,974 A | 12/1996 | Winner et al. ............... | 395/122 |
| 5,761,400 A | 6/1998 | Derby et al. ................. | 395/122 |
| 5,920,687 A | 7/1999 | Winner et al. ............... | 395/122 |

OTHER PUBLICATIONS

Woo et al. "OpenGL Programming Guide" pp 131, 233–234 1999.*

* cited by examiner

Primary Examiner—Almis R. Jankus
(74) Attorney, Agent, or Firm—Townsend and Townsend and Crew LLP

(57) ABSTRACT

A display is partitioned into a plurality of cells. Each of the plurality of cells includes a depth interval and a coverage for each of a plurality of surfaces having coverage within the cell. A depth interval and a coverage for a group of pixels having coverage within one or more of the cells is received. Visibility of the group of pixels, for each of the one or more cells, is determined based on comparisons of the depth interval of the group of pixels with the depth intervals of the plurality of surfaces.

31 Claims, 17 Drawing Sheets

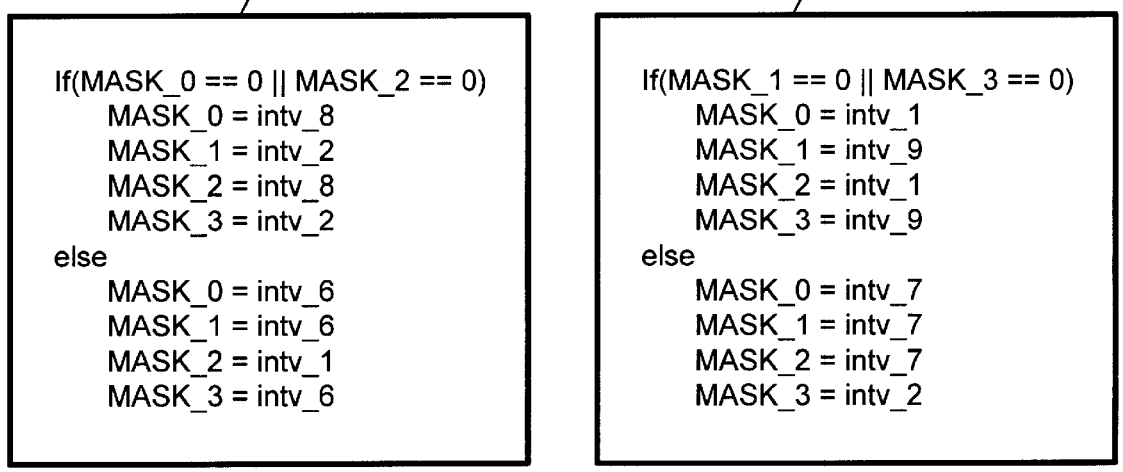

|  | MASK_0_STATE | | |
|---|---|---|---|
|  | HIDDEN | OVERLAP | VISIBLE |
| MASK_1_STATE HIDDEN | MASK_0 = intv_1<br>MASK_1 = intv_2<br>MASK_2 = intv_1<br>MASK_3 = intv_2 | MASK_0 = intv_4<br>MASK_1 = intv_2<br>MASK_2 = intv_4<br>MASK_3 = intv_2 | See 1604 |
| OVERLAP | MASK_0 = intv_1<br>MASK_1 = intv_5<br>MASK_2 = intv_1<br>MASK_3 = intv_5 | MASK_0 = intv_4<br>MASK_1 = intv_5<br>MASK_2 = intv_4<br>MASK_3 = intv_5 | MASK_0 = intv_6<br>MASK_1 = intv_6<br>MASK_2 = intv_1<br>MASK_3 = intv_6 |
| VISIBLE | See 1606 | MASK_0 = intv_7<br>MASK_1 = intv_7<br>MASK_2 = intv_7<br>MASK_3 = intv_2 | MASK_0 = intv_0<br>MASK_1 = intv_0<br>MASK_2 = intv_3<br>MASK_3 = intv_3 |

1602

1604:
```
If(MASK_0 == 0 || MASK_2 == 0)
    MASK_0 = intv_8
    MASK_1 = intv_2
    MASK_2 = intv_8
    MASK_3 = intv_2
else
    MASK_0 = intv_6
    MASK_1 = intv_6
    MASK_2 = intv_1
    MASK_3 = intv_6
```

1606:
```
If(MASK_1 == 0 || MASK_3 == 0)
    MASK_0 = intv_1
    MASK_1 = intv_9
    MASK_2 = intv_1
    MASK_3 = intv_9
else
    MASK_0 = intv_7
    MASK_1 = intv_7
    MASK_2 = intv_7
    MASK_3 = intv_2
```

*FIG. 18*

METHOD AND APPARATUS FOR DETERMINING VISIBILITY OF GROUPS OF PIXELS

BACKGROUND OF THE INVENTION

The present invention relates in general to graphics data processing, and in particular to methods and systems for determining visibility of triangles and polygons.

In the field of computer graphics, complex images are generated from simple geometries such as triangles and polygons. A typical 3-dimensional (3-D) computer generated image may consist of millions of triangles and polygons. Each of these triangles and polygons, and mode information about the triangles and polygons, must be stored in memory and processed rapidly. Accordingly, developing techniques for efficiently storing graphics data in memory and rapidly processing that data are critical to improving the performance of computer graphics systems.

From any given viewpoint, not all triangles forming 3-D objects are visible. For example, if the 3-D object were a building, the backside of the building would not be visible. Thus, typical 3-D graphics systems include a visibility subsystem for determining which triangles are visible. Only those triangles that are found visible by the visibility subsystem are rendered, thus improving the efficiency of the computer graphics system.

Prior art methods of determining visibility of a triangle have included using distance information associated with the triangle or polygons. For example, if, at a particular pixel location, a current polygon is more distant than the last polygon drawn at that location, then the current polygon is not visible at that pixel location. Thus, in a z-buffer system, the distance to the last polygon for each pixel on the screen is stored in a z-buffer array. When determining whether a new polygon is visible, the depth value of each pixel of the polygon is compared to the corresponding element in the z-buffer array. If a pixel of the new polygon has a depth greater than the depth value in the corresponding z-buffer array element, then that pixel is not visible. Else, if a pixel of the new polygon has a depth less than the depth value in the corresponding z-buffer array element, then that pixel is visible, and its depth value is stored in the z-buffer array element.

The z-buffer technique requires depth comparisons on a per-pixel basis. Thus, the z-buffer technique requires expensive hardware to handle the required throughput. Additionally, many graphics systems now employ anti-aliasing techniques that generate several sub-pixels for each pixel displayed. Because each sub-pixel has a depth value, the z-buffer technique requires depth comparisons on a sub-pixel-by-sub-pixel basis, thus increasing costs even more.

Other techniques have tried to improve on the z-buffer method. For example, in a hierarchical z-buffer, the screen is partitioned into a hierarchy of regions, proceeding from a coarsest granularity to a finest granularity. The region at the top of a hierarchy may be a full screen, and the regions in the next level in the hierarchy may be the screen partitioned into quarters. These quarter screen regions are referred to as children of the full screen region, and the full screen regions is referred to as the ancestor of the quarter screen regions. Similarly, the hierarchy may continue down to a finest level in which each pixel or sub-pixel corresponds to a region. At each region of the hierarchical z-buffer, a maximum z value is maintained. The maximum z value of a region corresponds to the maximum z values of the region's children. At the finest resolution, (i.e., at the pixel or sub-pixel level), the maximum z value corresponds to a traditional z-buffer. This methods attempts to determine visibility of a triangle at as high a level in the hierarchy as possible. For example, the minimum depth of a triangle may first be compared to the maximum z-value of the full screen region of the hierarchical z-buffer. If the minimum depth of the triangle is greater than the maximum z-value of the full screen region, then the triangle must be hidden. Therefore, the triangle need not be rendered. However, if the minimum depth of the triangle is not greater than the maximum z-value of the full screen region, then the triangle is similarly compared in each of the children of the full screen region. This process is similarly repeated down the hierarchy until the visibility of all the pixels in the triangle can be determined. If any pixel of any triangle is determined to be visible at the pixel or sub-pixel level, the maximum z values of the corresponding ancestor regions are updated with the new maximum z-value.

The hierarchical z-buffer method thus may be able to determine the visibility of a triangle without having to do a pixel-by-pixel comparison. However, the hierarchical z-buffer method is difficult to implement in hardware because of its iterative nature. For instance, z-values must be iteratively compared down the hierarchy, and maximum z-values must be iteratively updated up the hierarchy. Additionally, it is difficult to use the hierarchical z-buffer method when the depth compare operator changes in the course of displaying 3-D images, or when factors other than depth are to be used in determining visibility (i.e. stenciling).

SUMMARY OF THE INVENTION

The present invention offers methods and systems for determining visibility of groups of pixels in a 3-D graphics system. Broadly, according to the present invention, the visibility of a group of pixels is determined by comparing depth interval and coverage information of the group of pixels with depth interval and coverage information of a plurality of surfaces.

Benefits of the present invention include reducing the computation cost of visibility determination by determining visibility of groups of pixels without resorting to pixel-by-pixel depth computations and comparisons. Other benefits include providing an efficient method of determining visibility that may be easily implemented in hardware.

In one embodiment according to the invention, a method for determining visibility of groups of pixels performed by a computer graphics system is provided. The method comprises partitioning a display into a plurality of cells, wherein each of the plurality of cells includes a depth interval and a coverage for each of a plurality of surfaces having coverage within the each of the plurality of cells. The method additionally comprises receiving a depth interval and a coverage for a group of pixels having coverage within one or more of the plurality of cells. The method further comprises, for each of the one or more cells, determining a visibility of the group of pixels based on comparisons of the depth interval of the group of pixels with the depth intervals of the plurality of surfaces.

In another embodiment according to the invention, a visibility subsystem in a computer graphics system for determining visibility of groups of pixels is provided. The visibility subsystem includes a group depth buffer having a plurality of group depth buffer cells, each group depth buffer cell corresponding to a display region of a display. Each group depth buffer cell is configured to receive a depth interval of a group of pixels within the corresponding display region and a coverage of the group of pixels within the corresponding display region. Each group depth buffer cell is further configured to generate a visibility coverage of the group of pixels within the corresponding display region.

In yet another embodiment of the invention, a computer system for processing graphics data is provided. The computer system comprises a visibility subsystem coupled to a memory. The visibility subsystem includes a scan converter coupled to a group depth buffer, and the group depth buffer has a plurality of group depth buffer cells corresponding to a plurality of regions of a display. The visibility subsystem is configured to generate visibility coverages of groups of pixels. The computer system further comprises a rendering engine coupled to the visibility subsystem and the memory. The rendering engine is configured to receive visibility coverages of the groups of pixels and to render visible portions of the group of pixels.

In another aspect according to the invention, a method performed by a computer graphics system of determining a depth interval of a group of pixels within a region is provided. The method includes determining a depth of the group of pixels at a center of the region. The method also includes determining a bound on a positive change in depth of the group of pixels from the center of the region to any pixel of the group of pixels within the region, and determining a first endpoint of the depth interval based on the sum of the depth of the group of pixels at the center of the region with the bound on the positive change in depth. The method further includes determining a bound on a negative change in depth of the group of pixels from the center of the region to any pixel of the group of pixels within the region, and determining a second endpoint of the depth interval based on the subtraction of the bound on the negative change in depth from the depth of the group of pixels at the center of the region.

These and other features and advantages of the present invention will be better understood with reference to the detailed description below and the accompanying diagrams.

BRIEF DESCRIPTION OF THE DRAWINGS

FIG. 18 illustrates one embodiment of a method for determining two depth intervals.

DESCRIPTION OF THE SPECIFIC EMBODIMENTS

Figure 1:
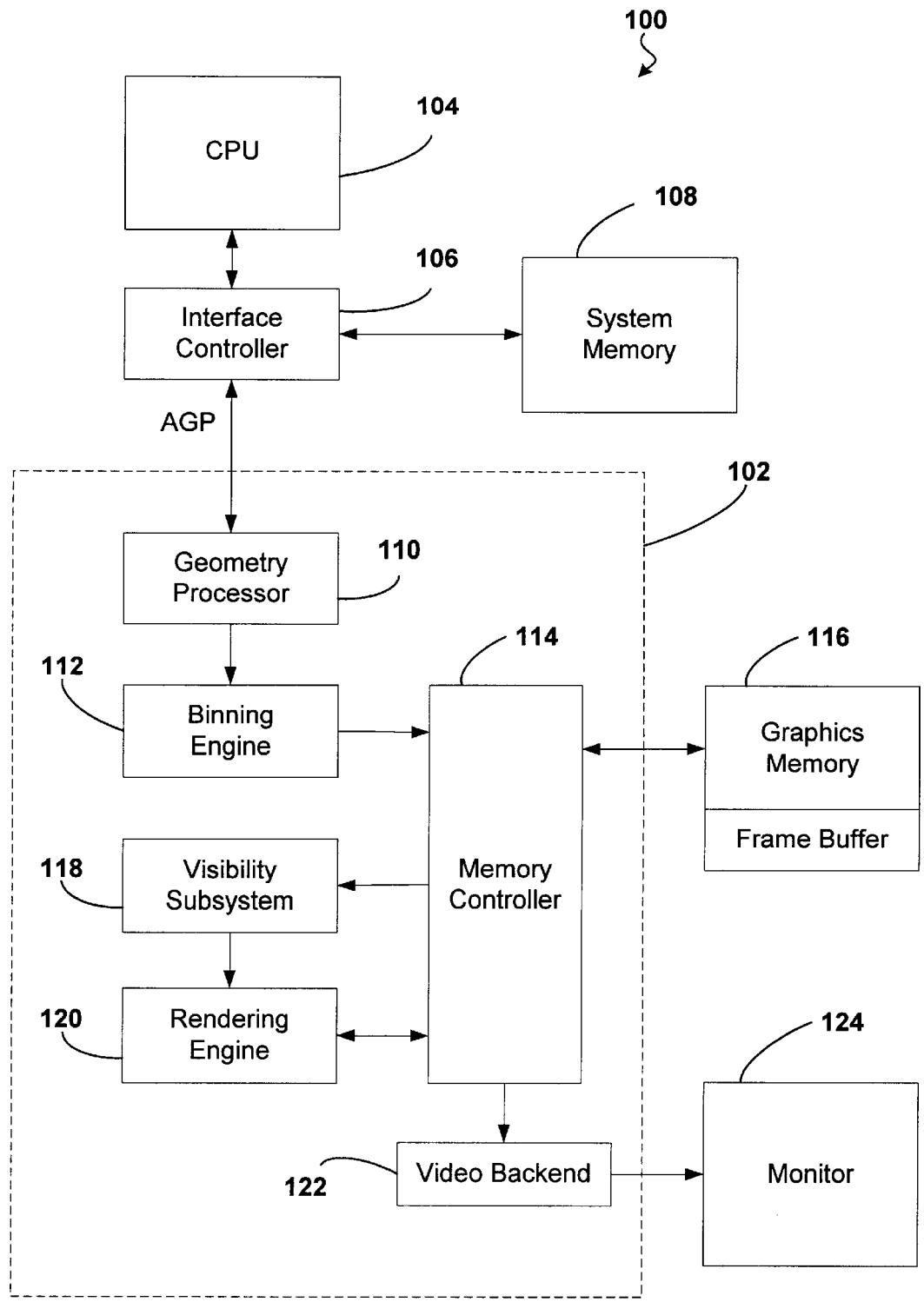
FIG. 1 is a simplified block diagram of a graphics system that processes graphics data in accordance with an embodiment of the present invention.

FIG. 1 is a simplified block diagram of a graphics system that processes graphics data in accordance with an embodiment of the present invention. This diagram is used herein for illustrative purposes only and is not intended to limit the scope of the invention.

A graphics processor 102 is coupled to a central processing unit (CPU) 104 by an advanced graphics protocol (AGP) bus via an interface controller 106. System memory 108 also couples to CPU 104 via interface controller 106. Graphics processor 102 includes a geometry processor 110 that receives graphics data on the AGP from CPU 104 or system memory 108. Graphics data typically includes geometry data and mode data. Geometry data comprises information relating to various polygons (e.g., triangles, parallelograms, rectangles, circles, etc.) which are processed to produce a complete image. Geometry data specifies, for example, the vertices (e.g., in X, Y, Z coordinates) and color (e.g., red-green-blue (RGB)) combinations for various polygons. Mode data comprises information relating to various modes affecting the appearance of one or more geometries when displayed. For example, for a given geometry, mode data can define or specify one or more "textures" (e.g., fur, brick, bark, sky), blending effects, translucence effects, and the like, which may be applied to the rendered geometry.

Geometry processor 110 supplies the graphics data to a binning engine 112. Using the graphics data, binning engine 112 reproduces the associated geometries and modes in an image frame which comprises a plurality of grid-like regions referred to as tiles. Binning engine 112 determines which tiles are "touched" by each geometry. For every tile, the graphics data for each geometry touching the tile is linked to the tile. This linked data is output by binning engine 112 per tile. A memory controller 114 is coupled to binning engine 112 and routes the tile data for storage into various portions, or bins, of a graphics memory 116.

A visibility subsystem 118 is coupled to the memory controller 116, and accesses the graphics data contained in graphics memory 116. The visibility subsystem 118 receives information corresponding to polygons, and attempts to identify the visible portions of the polygons. Then, the visibility subsystem 116 provides visibility information to a rendering engine 120. In one embodiment, the visibility subsystem 116 provides to the rendering engine 120 an identification of the anti-aliasing sub-pixels in a polygon that are visible or that may be visible. In another embodiment, the visibility subsystem 116 provides to the rendering engine 120 an identification of the anti-aliasing sub-pixels in a polygon that are visible, as well as an identification of the anti-aliasing sub-pixels in a polygon that may be visible.

The rendering engine 120 is also coupled to memory controller 116 and accesses the binned graphics data contained in graphics memory 116 to render an image for display. The rendering engine 120 only accesses graphics data that the visibility subsystem 118 has determined is visible or may be visible. Thus, memory bandwidth requirements are reduced because the rendering engine 120 does not access the graphics data corresponding to polygons or portions of polygons that are hidden.

It is to be understood that although the present invention has been discussed in the context of a graphics system employing a "tiling" technique, the invention is not limited to tiling graphics systems. Rather, the present invention may be used in a variety of different types of graphics systems. It is also to be understood that the various functional blocks in the graphics system 100 may be implemented by a combination of hardware and/or software, and that in specific implementations some or all of the functionality of some of the blocks may be combined. For example, while the diagram shows graphics memory 116 as a separate block from graphics processor 102, a certain amount of memory for binning or other purposes may be provided in the graphics processor block. Alternatively, graphics memory 116 may be unified with system memory 108 in a "unified memory" approach. Furthermore, in some embodiments, the geometry processor 110 may be implemented on the CPU 104.

Group Depth Buffer

Figure 2:
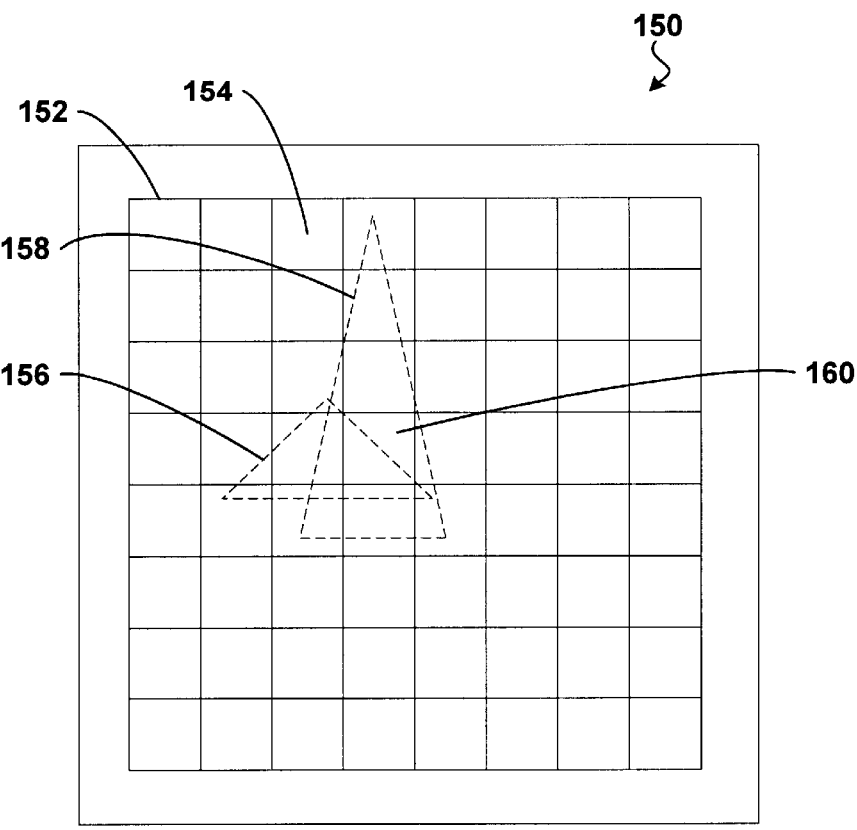
FIG. 2 is a simplified front view of a graphics display.

Various embodiments for determining visibility according to the present invention that may be employed by the visibility subsystem 118 in the system 100 will now be discussed. FIG. 2 is a simplified front view of a graphics display 150. The display 150 includes a display area 152. In an embodiment of the present invention, the display area 152 is partitioned into a plurality of tiles or cells 154. Although FIG. 2 shows the display area 152 partitioned into 64 square cells 154, the display area 152 is typically divided into many more cells, and each cell need not be square. For example, the display area 152 may be partitioned such that each cell 154 corresponds to a 4-by-2, 4-by-4, or the like, group of pixels. Additionally, each cell 154 need not be of the same size.

As is well known in the art, complex 3-dimensional (3-D) images are typically generated from simple geometries such as triangles, polygons, circles, and the like (hereinafter referred to as triangles). Triangles are typically assigned depth information that may be used in determining their visibility with respect to other triangles. For example, the vertices of a triangle may each be assigned a depth value. Using the depth values of the vertices, a depth value for each pixel of a triangle may be determined. Similarly, if anti-aliasing sub-pixels are implemented, a depth value for each sub-pixel of a triangle may be determined. As used hereinafter, the term "pixel" is intended to refer to pixels and/or anti-aliasing sub-pixels. FIG. 2 illustrates two triangles 156 and 158 on the display area 152. As illustrated, each of the triangles 156 and 158 falls within a plurality of the cells 154. However, a small triangle may fall within only one of the cells.

In an embodiment of the invention, a group depth buffer cell corresponds to each of the cells 154. A group depth buffer cell determines the group visibility of an incoming group of pixels that fall within its corresponding cell 154. The group of pixels may be, for example, a portion of a triangle falling within the corresponding cell 154, or the like. As used herein, the term "group visibility" refers to the visibility of a group of pixels as compared to other groups of pixels (e.g. not visibility compared on a pixel-by-pixel or sub-pixel-by-sub-pixel basis). All of the group depth buffer cells corresponding to all of the cells 154 collectively form a group depth buffer. In an embodiment, the group depth buffer may be implemented in the visibility subsystem 118 of FIG. 1.

Figure 3:
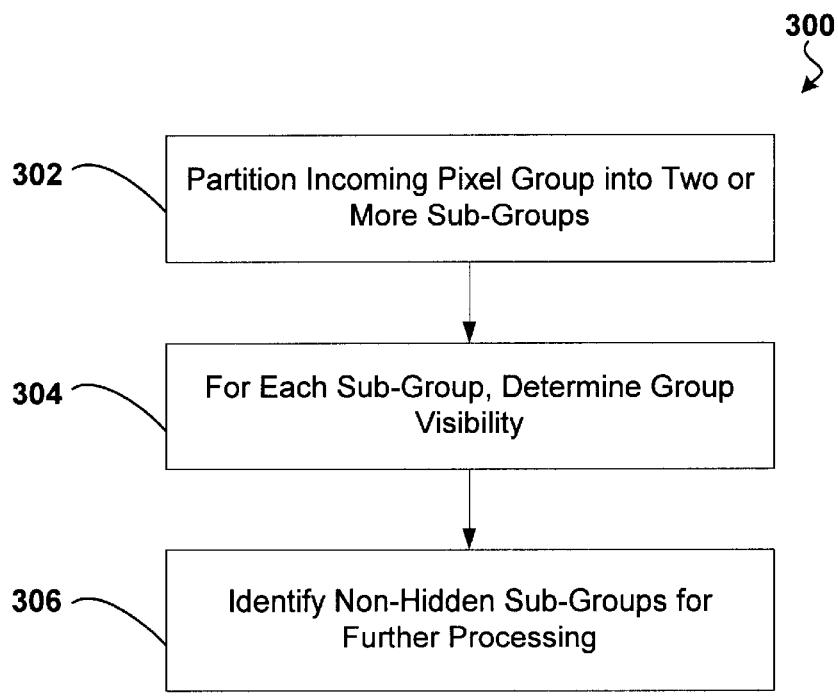
FIG. 3 is a simplified flow diagram illustrating the basic process for determining the visibility of an incoming group of pixels according to an embodiment of the invention.

FIG. 3 is a simplified flow diagram of a method according to an embodiment of the invention. This diagram is merely for illustrative purposes and is not intended to limit the scope of the claims herein. FIG. 3 illustrates the basic process for determining the visibility of an incoming group of pixels according to an embodiment of the invention. The visibility subsystem 118 of FIG. 1 may implement the method shown in FIG. 3 in analyzing the visibility of incoming pixel groups that fall within the group depth buffer cell's corresponding cell 154. In a step 302, the incoming group of pixels is partitioned into two or more sub-groups. Then, in a step 304, for each sub-group, the group visibility is determined. In one embodiment, the determination of group visibility may include determining that the sub-group is hidden, or that the sub-group may be visible. In another embodiment, the determination of group visibility may include determining that the sub-group is hidden, that the sub-group is visible, or that the sub-group may be visible. Finally, in a step 306, those sub-groups whose group visibility is not hidden are identified for further processing. For example, in one embodiment, those sub-groups that may be visible are identified so that the visibility of those sub-groups can be determined on a pixel-by-pixel basis.

Figure 4:
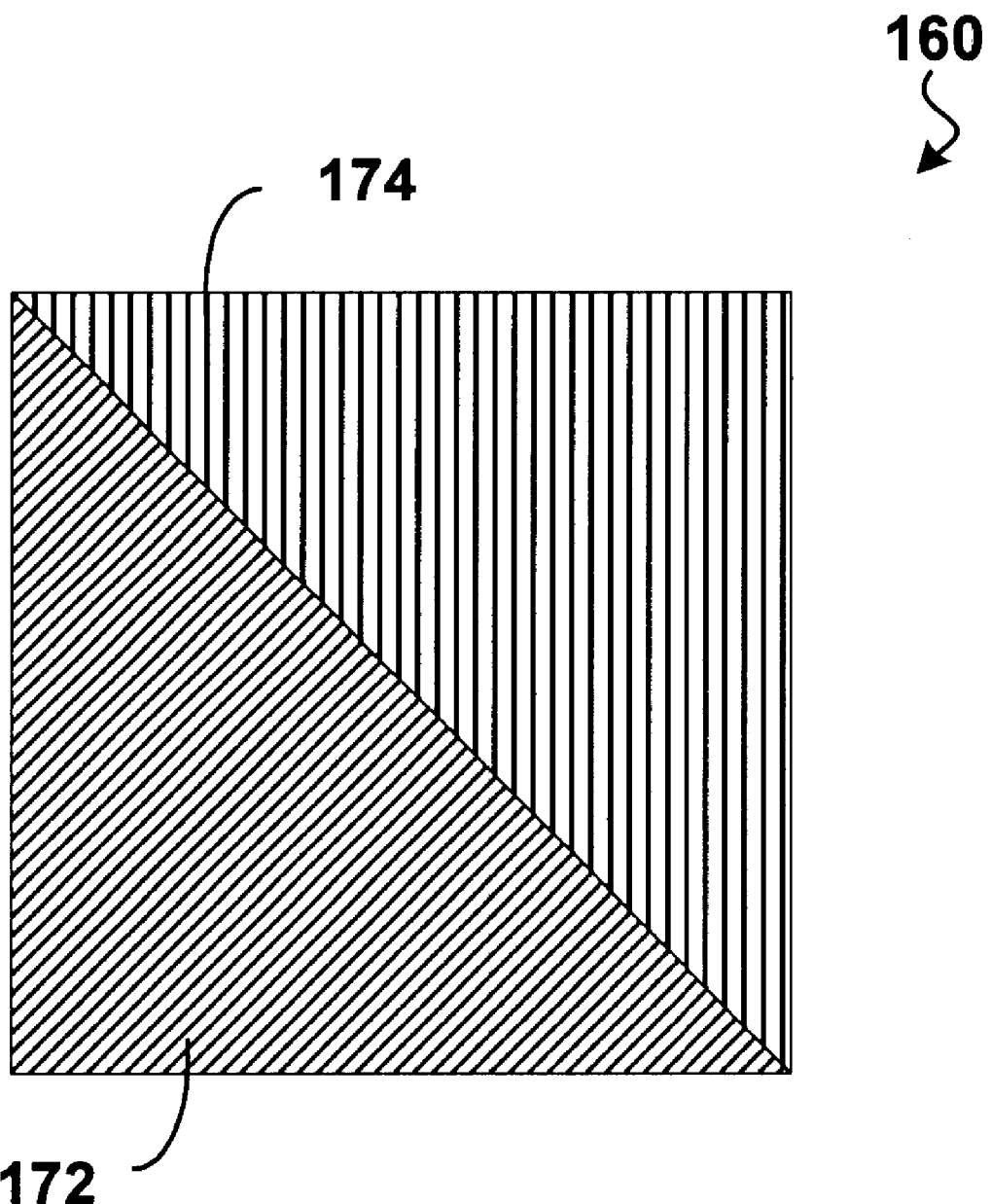
FIG. 4 is a simplified diagram that illustrates two surfaces.

In one embodiment, each group depth buffer cell includes information regarding a plurality of surfaces. A surface is a group of pixels that may include one or more triangles and portions of triangles that fall within a cell 154. With reference to FIG. 2, an example of a first surface corresponding to the cell 160 may be the portion of triangle 156 that falls within cell 160. An example of a second surface corresponding to the cell 160 may be the portion of triangle 158 that falls within cell 160, but excluding the portion of triangle 156 that falls within cell 160. Another example of a surface may be the portion of the intersection of triangles 156 and 158 that falls within cell 160. FIG. 4 is a simplified diagram that illustrates the example surfaces discussed above for the cell 160. The surface 172 corresponds to the portion of triangle 156 that falls within the cell 160. The surface 172 may also correspond to the intersection of triangles 156 and 158 that falls within cell 160. The surface 174 corresponds to the portion of triangle 158 that falls within the cell 160, but excluding the surface 172.

In one embodiment, each group depth buffer cell includes depth interval information and coverage information for each of the plurality of surfaces associated with the group depth buffer cell. For example, depth interval information for the surface 174 may include the minimum depth value and the maximum depth value for all the depth values associated with all the pixels of the triangle 158 that fall within the cell 160. In another embodiment, the depth interval information for the surface 174 may include the minimum depth value and the maximum depth value for all the depth values associated with all the pixels of the triangle 158 that fall within the cell 160, but excluding those pixels that overlap with triangle 156. In yet another embodiment, the depth interval information for the surface 174 may include the minimum depth value and the maximum depth value for all the depth values associated with all the pixels of the triangle 158, whether or not they fall within the cell 160. In still other embodiments, the depth interval information of a surface may include conservative bounds on the minimum depth value and the maximum depth value for all the depth values associated with a group of pixels.

Coverage information for a surface may include an identification of the particular pixels or sub-pixels in the corresponding cell 154 that the surface covers. For example, coverage information for the surface 174 may include an identification of the pixels that triangle 158 covers in the cell 160. In one embodiment, coverage information is included in a coverage mask, in which particular pixel locations within the corresponding cell 154 are indicated by bit positions within the coverage mask. Thus, a one, for example, in a particular bit location in the coverage mask indicates that the surface covers a corresponding pixel location in the cell 154. In an embodiment, the coverage of each of the plurality of surfaces corresponding to a group depth buffer cell is mutually exclusive of the coverages of the other surfaces of that cell. Also, the union of all the coverages of the surfaces corresponding to a group depth buffer cell provides full coverage of the cell 154. Additionally, a surface need not have contiguous coverage.

The following is an example of a C-language type definition which may be used to implement a group depth buffer cell that includes information regarding two surfaces:

```
COVER_TYPE g_msk_1st;    /* Coverage mask for 1st surface*/
DEPTH_TYPE g_z_1st[2];    /* Depth interval for 1st surface*/
DEPTH_TYPE g_z_2nd[2];    /* Depth interval for 2nd surface*/
};
``` where g_z_1st[0] is the minimum depth of the first surface, g_z_1st[1] is the maximum depth of the first surface, g_z_2nd[0] is the minimum depth of the second surface, and g_z_2nd[ 1] is the maximum depth of the second surface. A coverage mask for the second surface is not required because, as discussed previously, the coverage of the second surface is mutually exclusive from that of the first surface, and because the union of the two coverages provides full coverage. Hence, a coverage mask for the second surface is merely the bit-wise complement of g_msk_1st.

The following is an example of a C-language type definition which may be used to implement a group depth buffer cell that includes information regarding three surfaces:

struct group_depth_buffer_cell {

```
COVER_TYPE g_msk_1st    /* Coverage mask for 1st surface*/
COVER_TYPE g_msk_2st    /* Coverage mask for 2nd surface*/
DEPTH_TYPE g_z_1st[2];   /* Depth interval for 1st surface*/
DEPTH_TYPE g_z_2nd[2];   /* Depth interval for 2nd surface*/
DEPTH_TYPE g_z_3rd[2];   /* Depth interval for 3rd surface*/
};
``` where g_z_1st[0] is the minimum depth of the first surface, g_z_1st[ 1 ] is the maximum depth of the first surface, g_z_2nd[0] is the minimum depth of the second surface, g_z_2nd[1] is the maximum depth of the second surface, g_z_3rd[0] is the minimum depth of the third surface, and g_z_3rd[1] is the maximum depth of the third surface. A coverage mask for the third surface is not required because it may be determined by performing a bit-wise OR of g_msk_1st and g_msk_2nd, and then taking the bit-wise complement of the result.

Determining Depth Intervals

Various embodiments of methods for determining visibility of groups of pixels will be discussed shortly. These methods use depth intervals of groups of pixels in their visibility determinations. Accordingly, embodiments of methods for determining a depth interval of a group of pixels will first be discussed.

Figure 5:
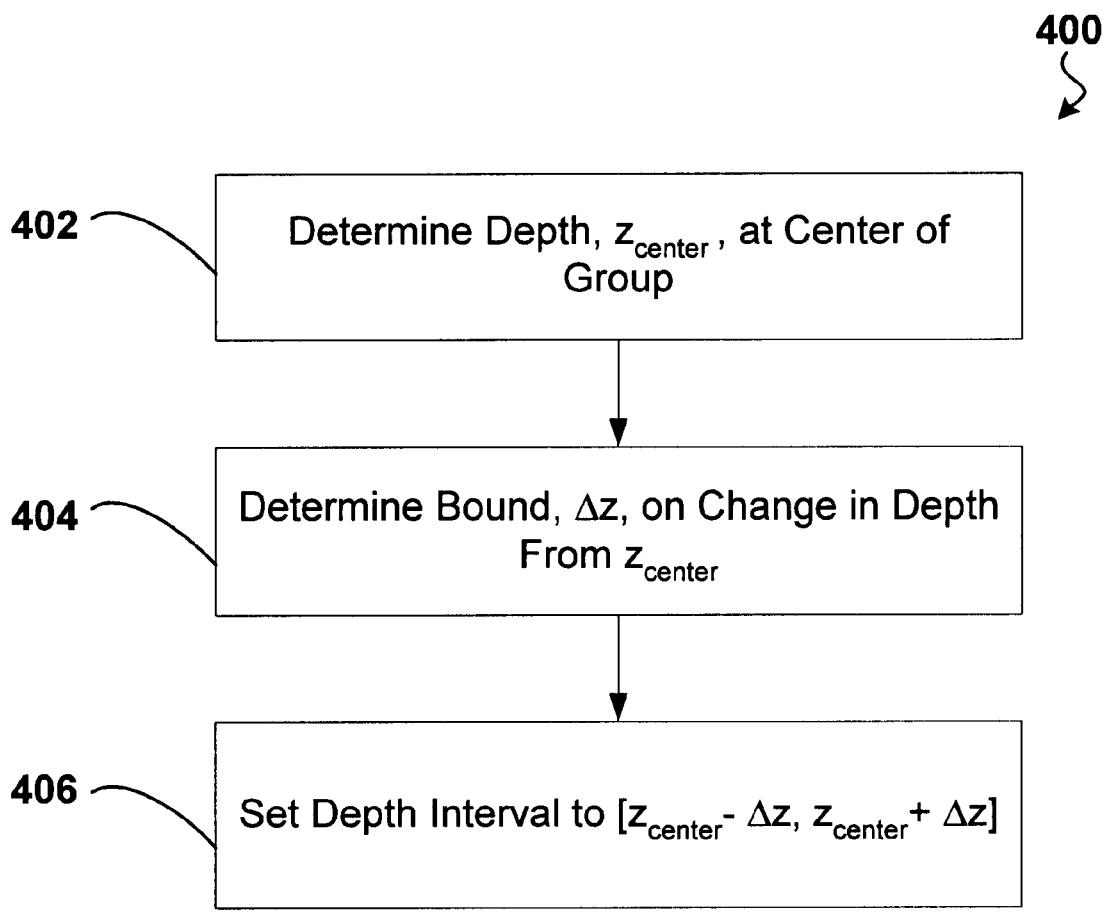
FIG. 5 is a simplified flow diagram illustrating a method for determining a depth interval of a group of pixels according to one embodiment of the invention.

FIG. 5 is a simplified flow diagram illustrating a method for determining a depth interval of a group of pixels according to one embodiment of the invention. This diagram is used herein for illustrative purposes only and is not intended to limit the scope of the invention. The method illustrated in FIG. 5 assumes that the group of pixels are a part of a planar surface. In a step 402, a depth value, $z_{center}$, is determined for the center of the group. The depth value $z_{center}$ may be determined in any number of ways known to those skilled in the art.

In a step 404, a bound, $\Delta z$, on the change in depth from $z_{center}$ is determined for the group of pixels. In one embodiment, the bound is determined according to the following equation:

$$\Delta z = \left|\frac{\partial z}{\partial x}\right| \Delta x\_max + \left|\frac{\partial z}{\partial y}\right| \Delta y\_max; \qquad (1)$$

where $$\left|\frac{\partial z}{\partial x}\right|$$

is the partial derivative of z with respect to x, $\Delta x\_max$ is the maximum x-coordinate difference between any pixel in the group and the center of the group, $$\left|\frac{\partial z}{\partial y}\right|$$

is the partial derivative of z with respect to y, and $\Delta y\_max$ is the maximum y-coordinate difference between any pixel in the group and the center of the group. The partial derivatives $$\left|\frac{\partial z}{\partial x}\right|$$

and $$\left|\frac{\partial z}{\partial y}\right|$$

may be computed using any number of ways known to those skilled in the art. Also, $\Delta x\_max$ and $\Delta y\_max$ may be computed using any number of ways known to those skilled in the art.

Referring again to FIG. 2, the above-described method of determining depth intervals could be used to determine a depth interval of the triangle 158 for each of the cells 154 into which it falls. A depth value, $z_{center}$, is determined, in step 402, for each of the cells 154 into which the triangle 158 falls. Additionally, a bound, Δz, is determined, in step 404, for each of the cells 154. Because the triangle is planar, the partial derivatives $$\left|\frac{\partial z}{\partial x}\right|$$

and $$\left|\frac{\partial z}{\partial y}\right|$$

remain constant over the triangle 158, and thus, need be computed only once, rather than for each of the cells 154. However, Δx_max and Δy max may change from cell to cell, and thus must be computed for each cell. Then, a depth interval is computed, as in step 406, for each of the cells.

If the cells 154 are rectangular, and each are of the same size, then the relative coordinate differences between any pixel and the center of a cell in which the pixel resides may be bounded, and the bounds may be the same for all cells. Hence, the values Δx_max and Δy max may be fixed as constants. In particular, if each cell is of a dimension w in the x-direction and h in the y-direction, then the values Δx_max and Δy_max may be bounded by w/2 and h/2 respectively. Thus, the equation for determining the bound Δz may be simplified:

$$\Delta z = \frac{\left|\frac{\partial z}{\partial x}\right| w + \left|\frac{\partial z}{\partial y}\right| h}{2}. \quad (2)$$

The bound Δz described in equation 2 is constant over a triangle, and thus, it need only be computed once per triangle, rather than once per cell 154 into which a triangle falls.

Finally, in a step 406, a depth interval is determined. In particular, the minimum of the depth interval is $z_{center}-\Delta z$, and the maximum of the depth interval is $z_{center}+\Delta z$.

In other embodiments, the depth interval of a group of pixels that are part of a triangle may be further bounded. In particular, the maximum depth value may be bounded by the maximum of the depth values at the vertices of the triangle. Similarly, the minimum depth value may be bounded by the minimum of the depth values at the vertices of the triangle.

Figure 6:
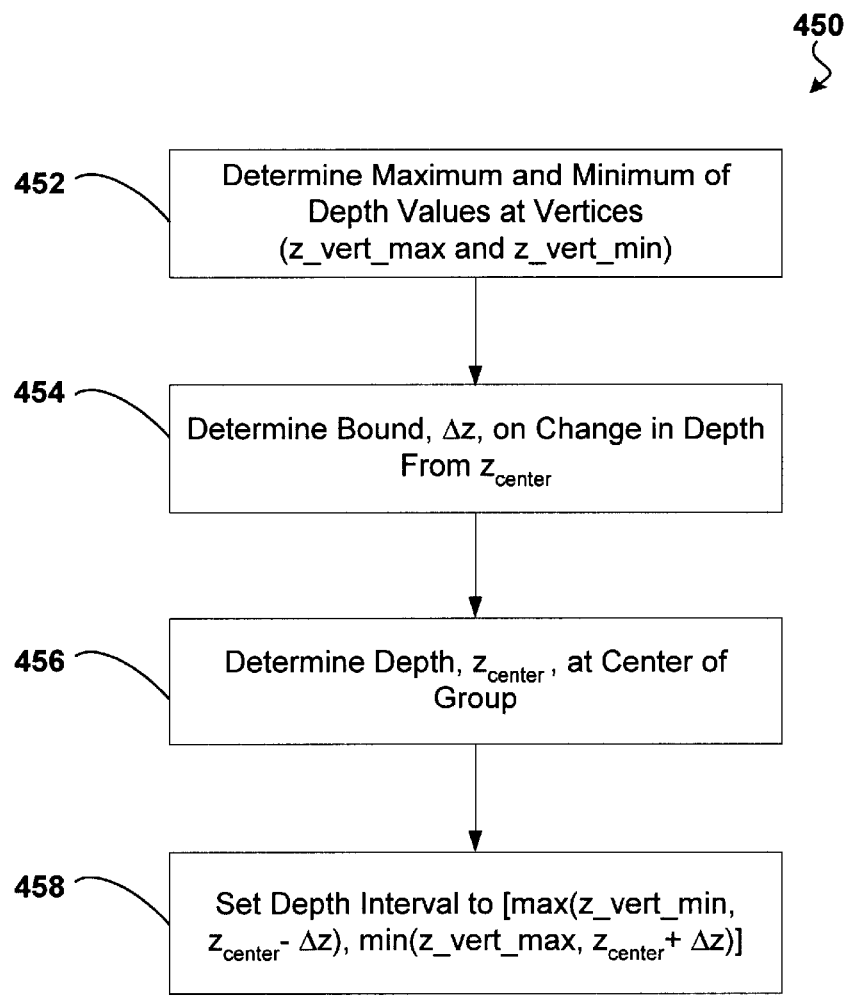
FIG. 6 is a simplified flow diagram illustrating a method for determining a depth interval of a triangle according to another embodiment of the invention.

FIG. 6 is a simplified flow diagram illustrating a method for determining a depth interval of a triangle according to another embodiment of the invention. This diagram is used herein for illustrative purposes only and is not intended to limit the scope of the invention. In a step 452, a maximum (z_vert_max) and a minimum (z_vert_min) of the depth values at the vertices of the triangle are determined. These values are constant for the triangle, and thus need only be determined once per triangle. Then, in a step 454, a bound, Δz, is determined. The bound Δz may be determined for each cell, for example, by computing equation 1, or a like method. Alternatively, the bound Δz may be determined once per triangle, for example, by computing equation 2, or a like method.

In a step 456, the depth value of the triangle at the center of a cell 154 into which the triangle falls is determined. Then, in a step 458, the depth interval of the triangle in the cell 154 is determined. In particular, the minimum depth value is the maximum of z_vert_min and $z_{center}-\Delta z$, and the maximum depth value is the minimum of z_vert_max and $z_{center}+\Delta z$.

Note that in the above embodiments, only one depth interval need be computed for a group of pixels. On the other hand, in the traditional z-buffer scheme, and potentially in the hierarchical z-buffer scheme, a depth value is computed for each pixel. Thus, embodiments of the present invention may require far fewer computations than the traditional z-buffer and hierarchical z-buffer schemes.

Determining Group Visibility

Figure 7A:
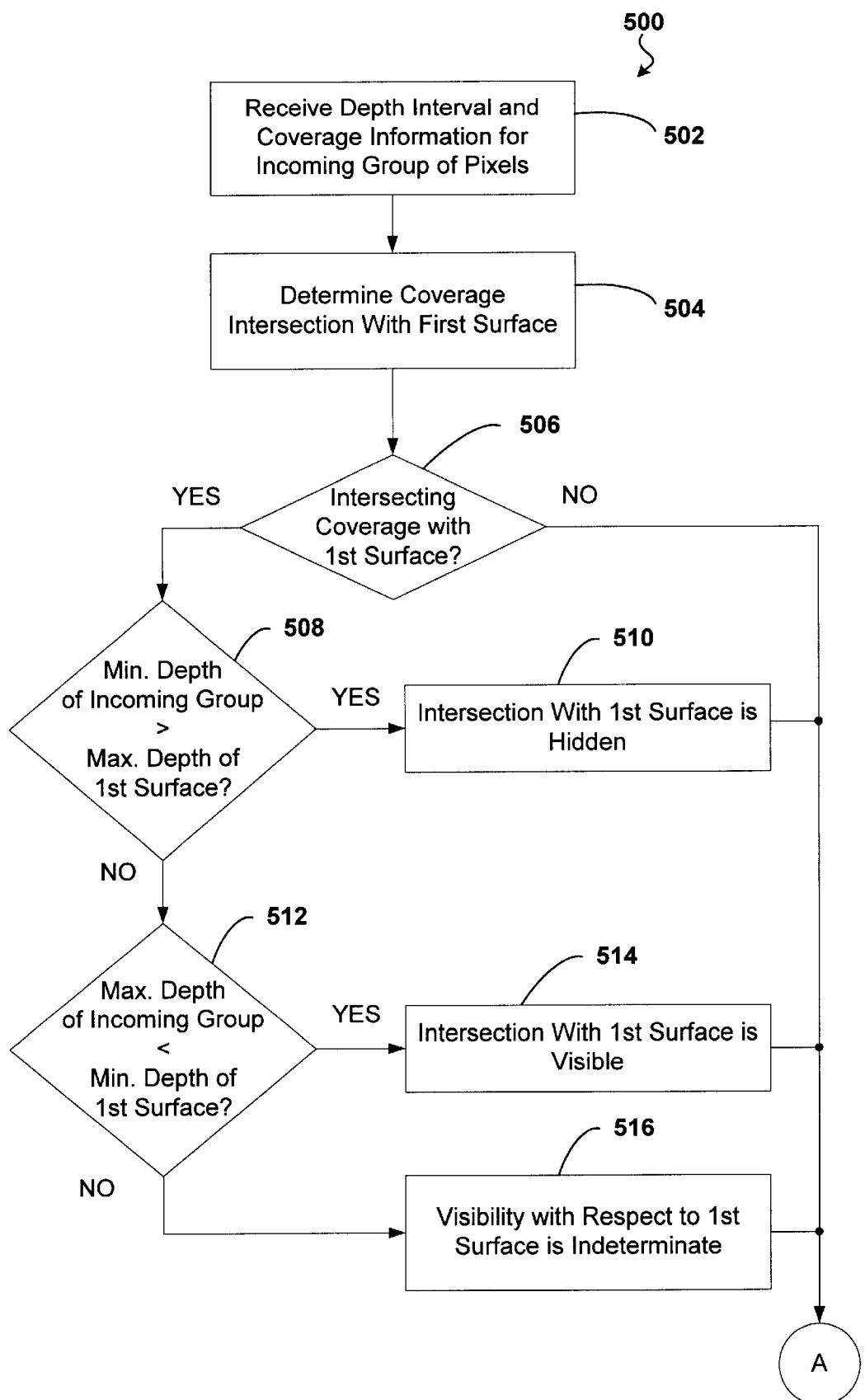
FIGS. 7A and 7B provide a more detailed illustrative example of a method for determining the visibility of a group of pixels according to one embodiment of the invention.
Figure 7B:
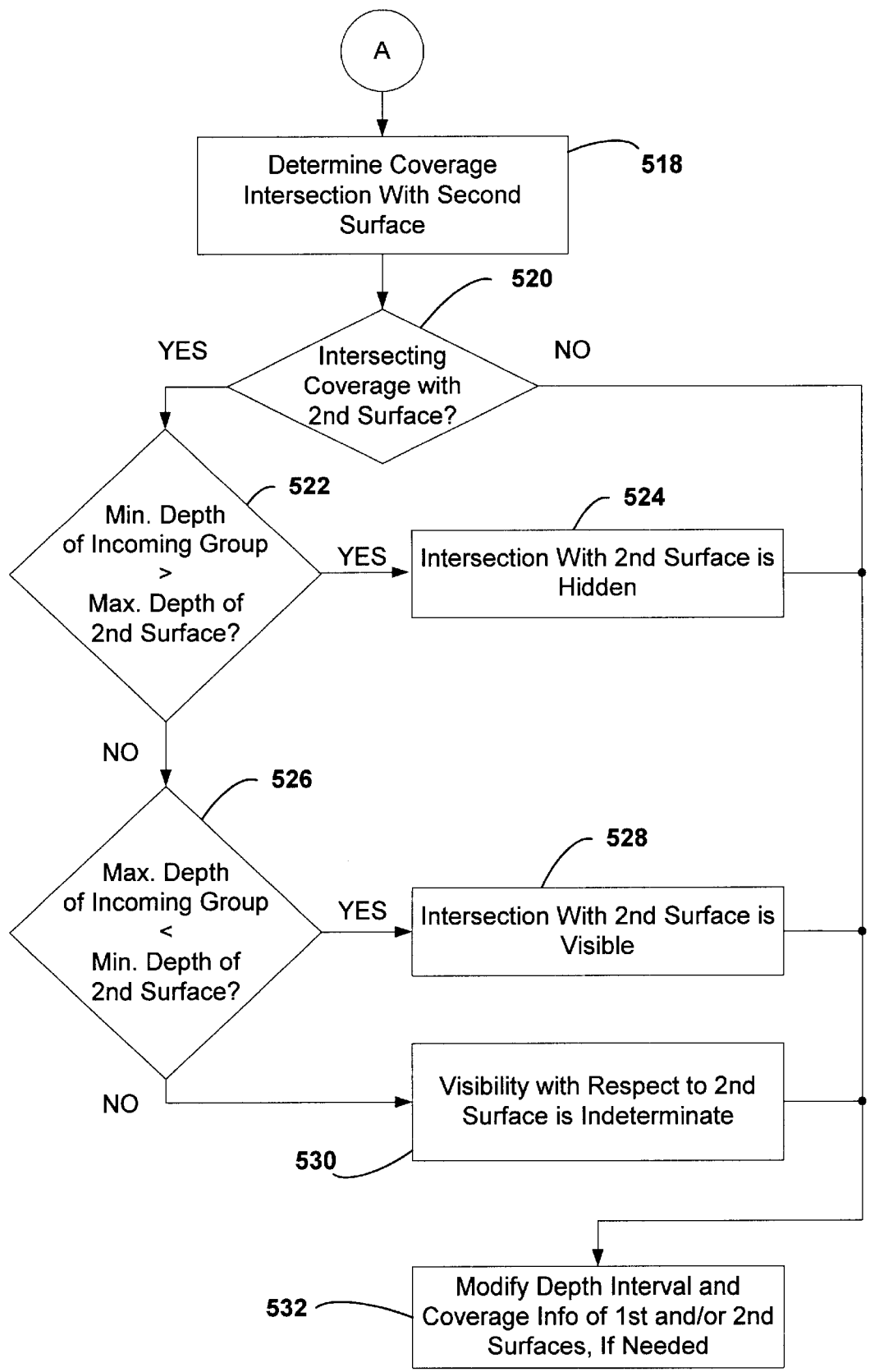
Figure 8:
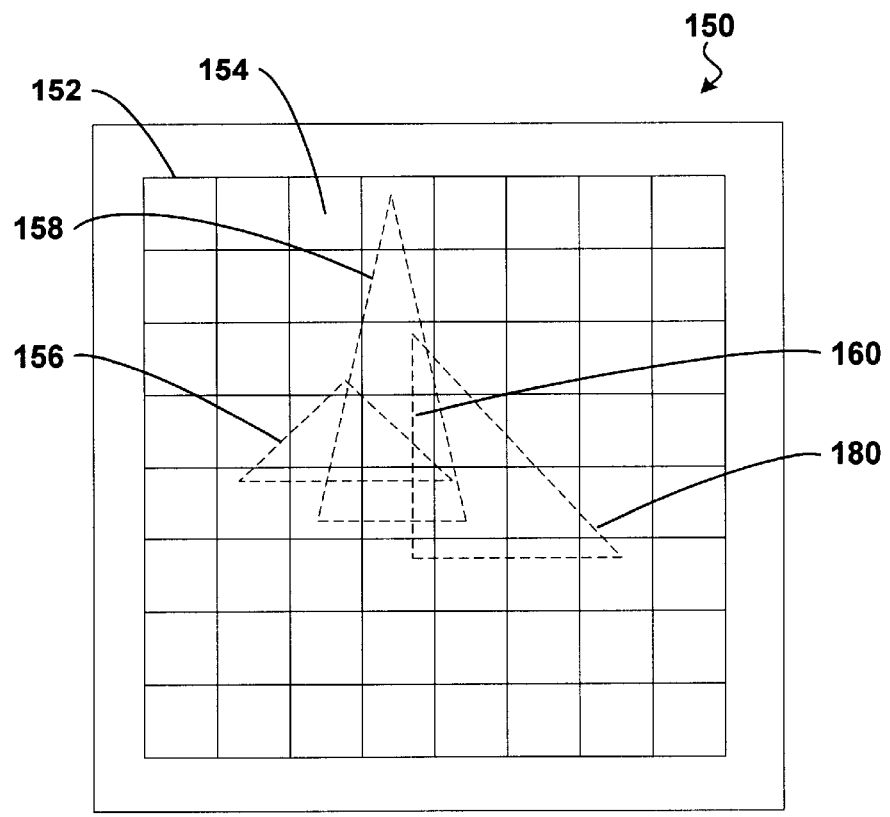
FIG. 8 is a simplified front view of a graphics display.

Various embodiments of methods for determining group visibility will now be described. FIGS. 7A and 7B provide a more detailed flow diagram illustrating a process for determining group visibility according to one embodiment of the invention. This diagram is used herein for illustrative purposes only and is not intended to limit the scope of the invention. FIGS. 7A and 7B illustrate a process for determining the group visibility of a group of pixels within a cell 154 corresponding to a group depth buffer cell. The group of pixels may correspond, for example, to the portion of a triangle that falls within the particular cell 154. For instance, FIG. 8 illustrates a triangle 180 on the display 150 whose visibility within the cell 160 is to be determined. Hence, the group of pixels corresponds to those pixels of the triangle 180 falling within the cell 160.

In the embodiment discussed with respect to FIGS. 7A and 7B, the group depth buffer cell includes information regarding two surfaces. However, it is to be understood that the present invention can be implemented with three or more surfaces. Similarly, it is to be understood that each cell need not include information regarding the same number of surfaces. For example, some may include information regarding two surfaces, whereas others may include information regarding three surfaces.

Figure 9:
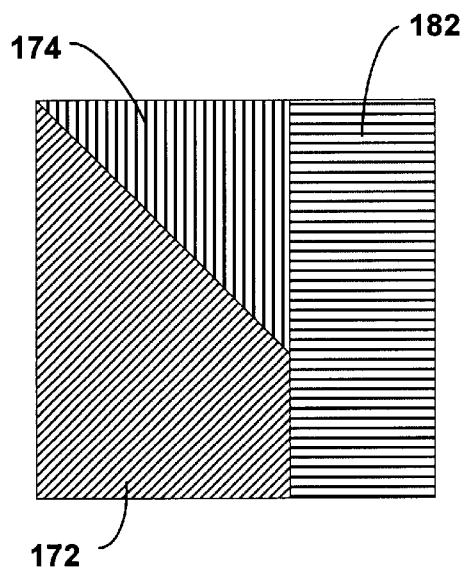
FIG. 9 is an illustration showing an example of an incoming group of pixels with respect to an existing first surface and an existing second surface.
Figure 10:
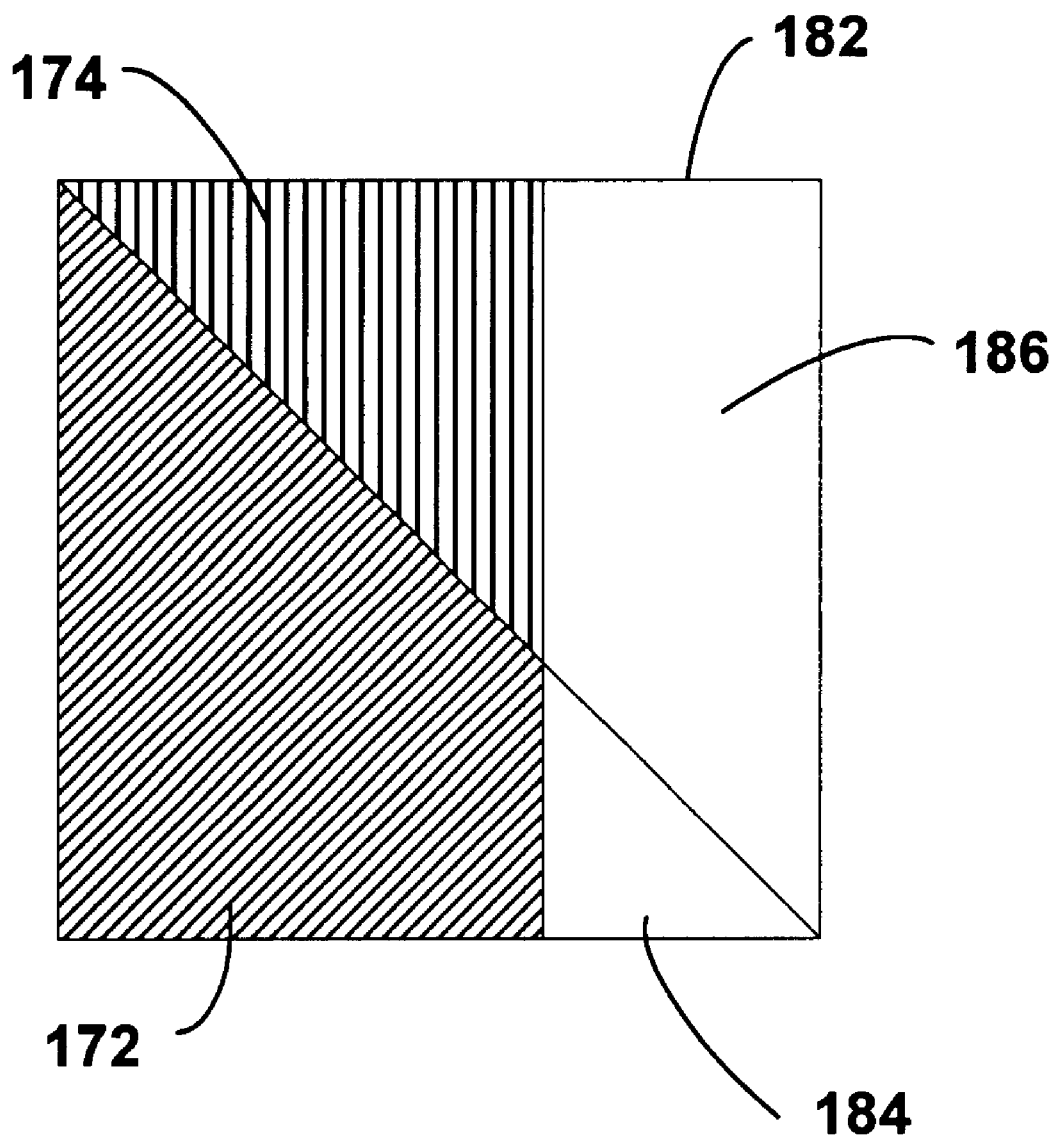
FIG. 10 shows the coverage intersection of an incoming group of pixels with a first surface, and the coverage intersection with a second surface.

In a step 502, depth interval information and coverage information are received for an incoming group of pixels whose group visibility is to be determined. Then, in a step 504, the intersection of the coverage of the incoming group of pixels with that of the first surface is determined. FIG. 9 is an illustration showing an example of an incoming group of pixels 182 with respect to an existing first surface 172 and an existing second surface 174. FIG. 10 shows the coverage intersection 184 of the incoming group of pixels 182 with the first surface 172.

If the coverages of the incoming group and the first surface intersect, then the flow proceeds to step 508. Otherwise, the flow proceeds to a step 518. In step 508, the depth interval of the incoming group is compared with that of the first surface. In particular, the minimum depth value of the incoming group is compared with the maximum depth value of the first surface. If the minimum depth value of the incoming group is greater than the maximum depth value of the first surface, then the incoming group of pixels must be behind the first surface. Hence, the flow proceeds to a step 510. In step 510, the group visibility of that portion of the incoming group having intersecting coverage with that of the first surface is determined to be hidden. Then, the flow proceeds to step 518.

On the other hand, if, in step 508, the minimum depth value of the incoming group is not greater than the maximum depth value of the first surface, then the flow proceeds to a step 512. In step 512, the maximum depth value of the incoming group is compared with the minimum depth value of the first surface. If the maximum depth value of the incoming group is less than the minimum depth value of the first surface, then the incoming group of pixels must be in front of the first surface. Hence, the flow proceeds to a step 514. In step 514, the group visibility of that portion of the incoming group having intersecting coverage with that of the first surface is determined to be visible. Then, the flow proceeds to step 518.

On the other hand, if, in step 512, the minimum depth value of the incoming group is not greater than the maximum depth value of the first surface, then the flow proceeds to a step 516. In step 516, the group visibility of that portion of the incoming group having intersecting coverage with that of the first surface is determined to be indeterminate. Then, the flow proceeds to step 518.

Steps 518, 520, 522, 524, 526, 528, and 530 are similar to steps 504, 506, 508, 510, 512, 514, and 516, respectively. However steps 518, 520, 522, 524, 526, 528, and 530 are taken with respect to the second surface. In step 518, the intersection of the coverage of the incoming group of pixels with that of the second surface is determined. Referring again to the examples shown in FIGS. 9 and 10, the coverage intersection 186 of incoming surface 182 with the second surface 174 is shown.

If the coverages of the incoming group and the second surface intersect, then the flow proceeds to step 522. Otherwise, the flow proceeds to a step 532. In step 522, the depth interval of the incoming group is compared with that of the second surface. In particular, the minimum depth value of the incoming group is compared with the maximum depth value of the second surface. If the minimum depth value of the incoming group is greater than the maximum depth value of the second surface, then the incoming group of pixels must be behind the second surface. Hence, the flow proceeds to a step 524. In step 524, the group visibility of that portion of the incoming group having intersecting coverage with that of the second surface is determined to be hidden. Then, the flow proceeds to step 532.

On the other hand, if, in step 522, the minimum depth value of the incoming group is not greater than the maximum depth value of the second surface, then the flow proceeds to a step 526. In step 526, the maximum depth value of the incoming group is compared with the minimum depth value of the second surface. If the maximum depth value of the incoming group is less than the minimum depth value of the second surface, then the incoming group of pixels must be in front of the second surface. Hence, the flow proceeds to a step 528. In step 528, the visibility of that portion of the incoming group having intersecting coverage with that of the second surface is determined to be visible. Then, the flow proceeds to step 532.

On the other hand, if, in step 526, the minimum depth value of the incoming group is not greater than the maximum depth value of the second surface, then the flow proceeds to a step 530. In step 530, the group visibility of that portion of the incoming group having intersecting coverage with that of the second surface is indeterminate. Then, the flow proceeds to step 532.

In step 532, the depth interval and coverage information for the first surface and the second surface are modified, if needed. These modifications may not be required if, for example, the incoming group of pixels was determined to be hidden with respect to both the first and second surfaces. These modifications incorporate the depth interval and coverage information of the incoming group of pixels into those of the first and second surfaces. This permits the use of the depth interval and coverage information received in step 502 to be used in determining the visibility of subsequent incoming groups of pixels, while maintaining the same number of surfaces (e.g. 2) within the group depth buffer cell.

Modifying Coverage Information for the Surfaces

Figure 11:
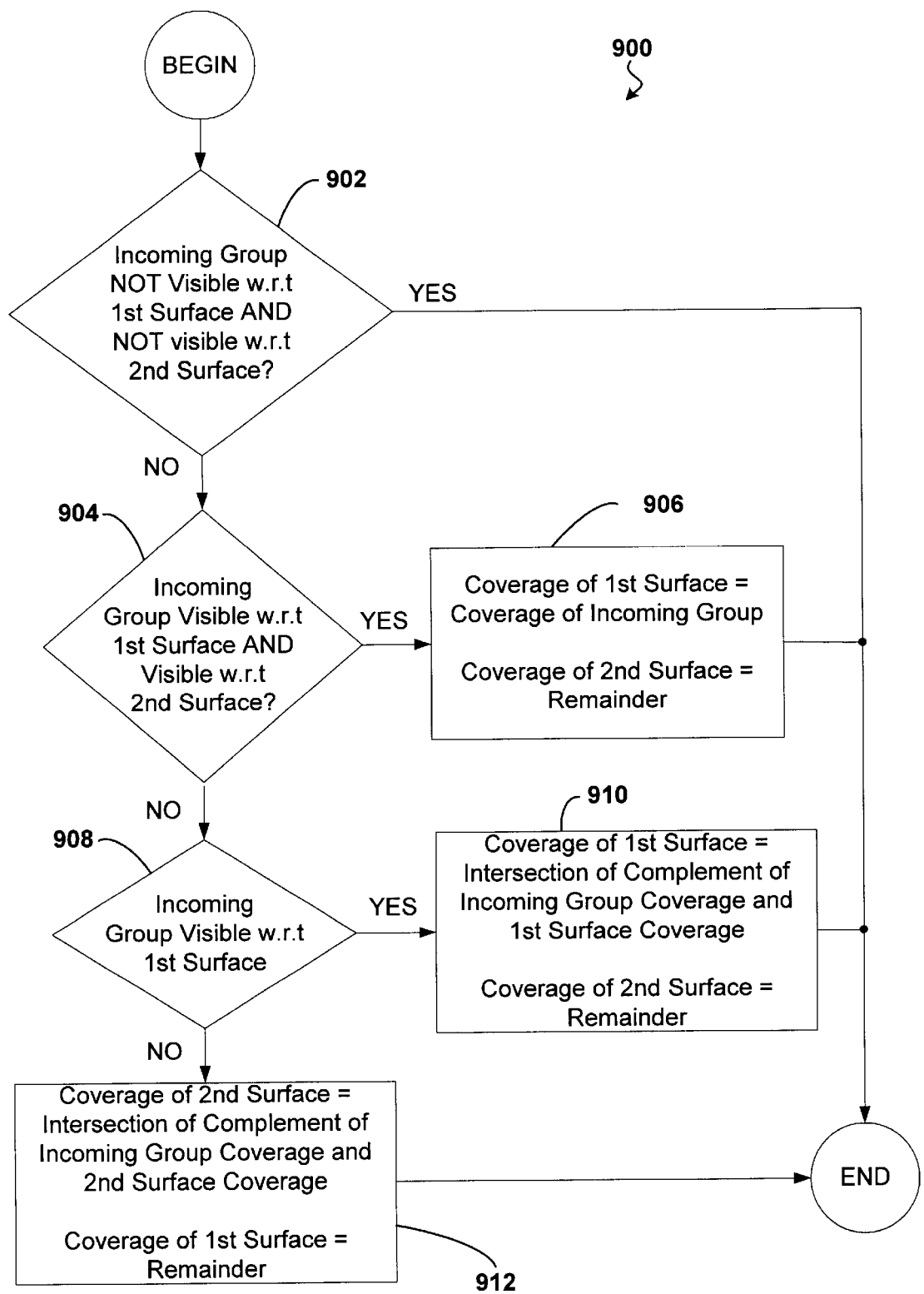
FIG. 11 is a flow diagram illustrating the process for modifying the coverage information for a first surface and/or a second surface according to one embodiment of the invention.

FIG. 11 is a simplified flow diagram illustrating a process according to an embodiment of the invention. This diagram is used herein for illustrative purposes only and is not intended to limit the scope of the invention. FIG. 11 illustrates the flow of a process for modifying the coverage information for the first surface and/or the second surface, if needed, as discussed with respect to step 532 of FIG. 7B. In a step 902, the group visibility of the incoming group of pixels with respect to the first surface and with respect to the second surface is examined. In particular, if the incoming group was not visible with respect to the first surface, and was not visible with respect to the second surface, then the coverages of the first and second surfaces need not be modified. However, if the incoming group of pixels was visible with respect to at least one of the first and second surfaces, then the flow proceeds to a step 904.

Figure 12:
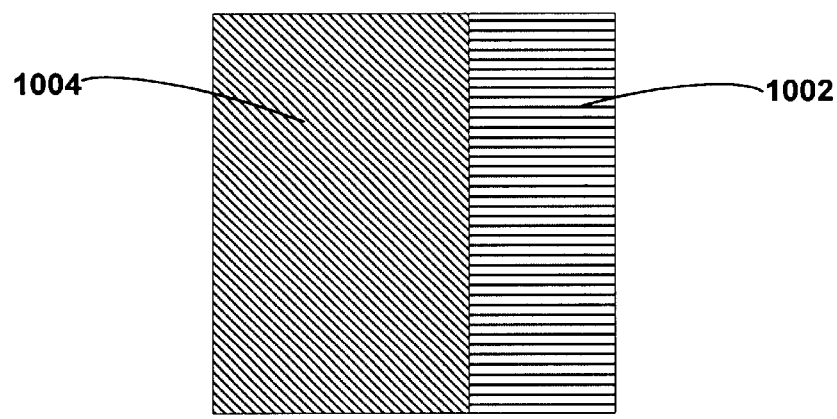
FIGS. 12, 13, and 14 illustrate various modified coverages of a first surface and a second surface.

In step 904, if the incoming group was visible with respect to both the first surface and with respect to the second surface, then the flow proceeds to a step 906. In step 906, the coverage of the first surface is set to that of the incoming group. And, the coverage of the second surface is set to the remaining coverage in the group depth buffer cell. In one embodiment, the coverage mask of the first surface is set to the coverage mask of the incoming group of pixels. And, the coverage mask of the second surfaces is set to the bit-wise complement of the coverage mask of the first surface. Referring to the examples illustrated in FIGS. 4, 9, and 12, FIG. 12 illustrates the modified coverages of the first surface 1002 and the second surface 1004 determined according to step 906.

Figure 13:
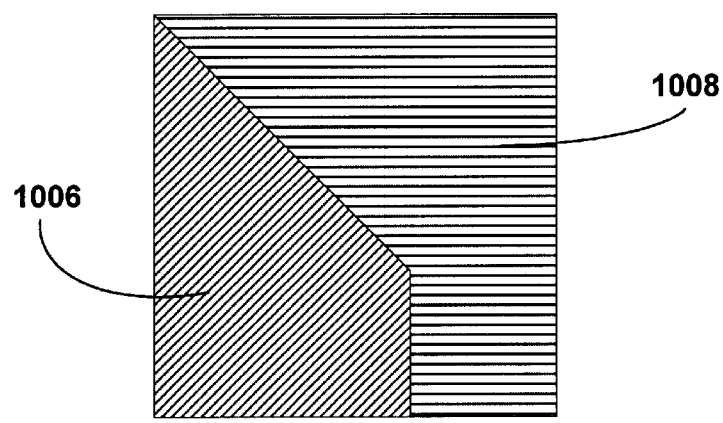

If in step 904, the incoming group was not visible with respect to both the first surface and with respect to the second surface, then the flow proceeds to a step 908. In step 908, if the incoming group was visible with respect to the first surface, then the flow proceeds to step 910. In step 910, the coverage of the first surface is set to the intersection of the coverages of the first surface and the complement of incoming group. And, the coverage of the second surface is set to the remaining coverage in the group depth buffer cell. In one embodiment, the coverage mask of the first surface is set to the bit-wise AND of the coverage mask of the first surface and the bit-wise complement of coverage mask of incoming group of pixels. And, the coverage mask of the second surfaces is set to the bit-wise complement of the coverage mask of the first surface. Referring to the illustrations in FIGS. 4, 9, and 13, FIG. 13 illustrates the modified coverages of the first surface 1006 and the second surface 1008 determined according to step 910.

Figure 14:
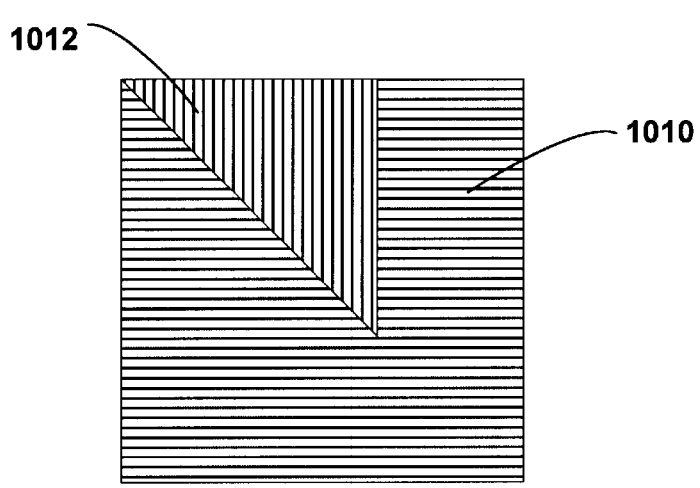

If in step 908, the incoming group of pixels was not visible with respect to the first surface, then the flow proceeds to a step 912. In step 912, the coverage of the second surface is set to the intersection of the coverage of the second surface and the complement of the coverage of the incoming group. And, the coverage of the first surface is set to the remaining coverage in the group depth buffer cell. In one embodiment, the coverage mask of the second surface is set to the bit-wise AND of the coverage mask of the second surface and the bit-wise complement of coverage mask of incoming group of pixels. And, the coverage mask of the first surfaces is set to the bit-wise complement of the coverage mask of the second surface. Referring to the examples illustrated in FIGS. 4, 9, and 14, FIG. 14 shows the modified coverages of the first surface 1010 and the second surface 1012 determined according to step 912.

Modifying Depth Interval Information for the Surfaces

Figure 15A:
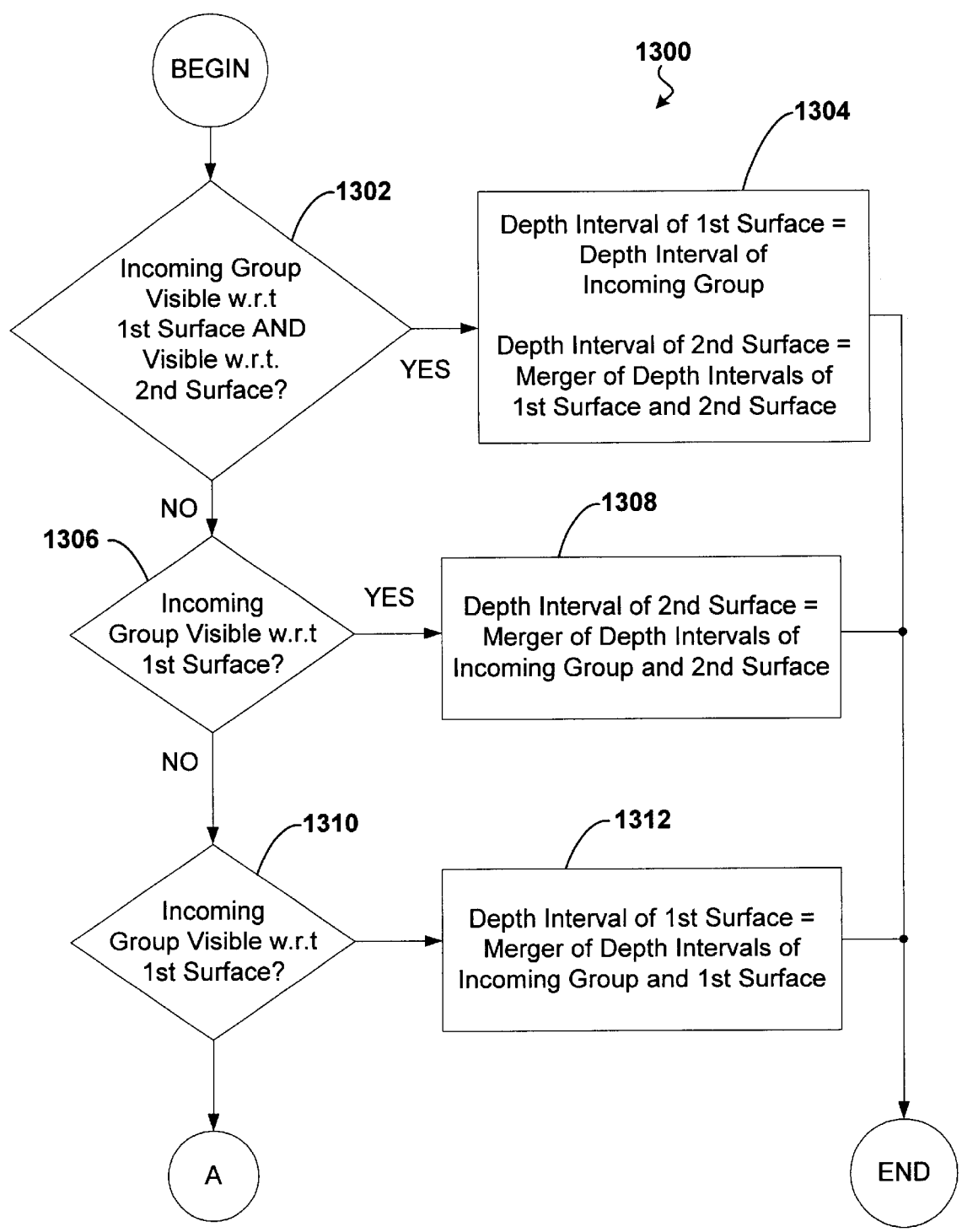
FIGS. 15A and 15B are flow diagrams illustrating the process for modifying the depth interval information for a first surface and/or the second surface according to one embodiment of the invention.
Figure 15B:
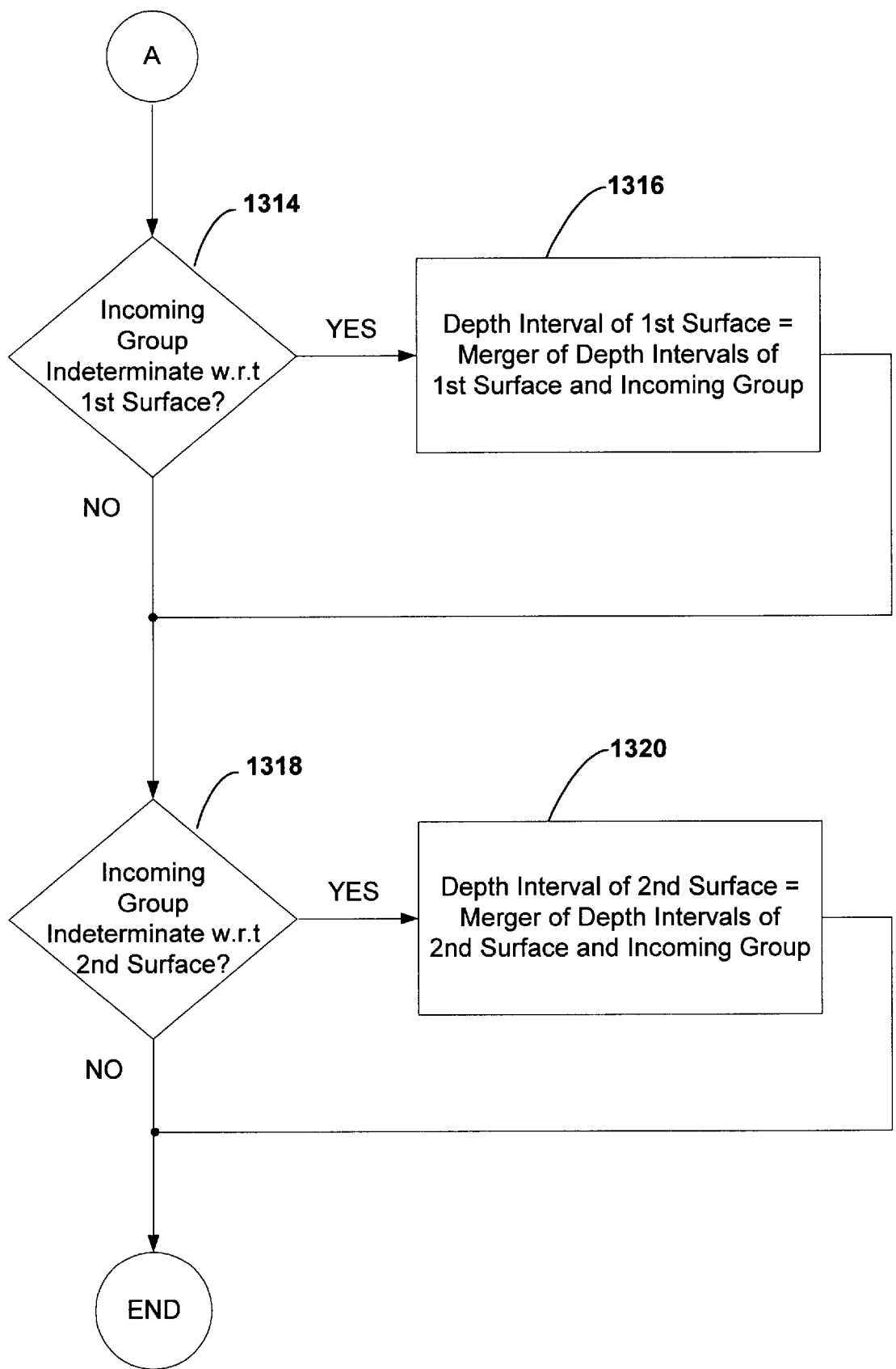

FIGS. 15A and 15B are a simplified flow diagram of a process according to an embodiment of the invention. This diagram is used herein for illustrative purposes only and is not intended to limit the scope of the invention. FIGS. 15A and 15B illustrate the flow of a process for modifying the depth interval information for the first surface and/or the second surface, if needed, as discussed with respect to step 532 of FIG. 7B. In a step 1302, if the incoming group of pixels was determined to be visible with respect to both the first surface and the second surface, then the flow proceeds to a step 1304. In step 1304, the depth intervals of both the first surface and the second surface are modified. In particular, the depth interval of the second surface is set to a merger of the depth intervals of the first surface and the second surface. The merging of depth intervals will be discussed below. Then, the depth interval of the first surface is set to the depth interval of the incoming group of pixels.

A merger of first and second depth intervals may include, for example, determining the greater of the maximum depth value of the first depth interval and the maximum depth value of the second interval, and determining the lesser of the minimum depth value of the first interval and the minimum depth value of the second interval. Thus, in one embodiment of step 1304, a new maximum depth value of the second surface is set to the greater of the maximum depth value of the first surface and the old maximum depth value of the second surface. Similarly, a new minimum depth value of the second surface is set to the lesser of the minimum depth value of the first surface and the old minimum depth value of the second surface.

But if, in step 1302, the incoming group of pixels was not determined to be visible with respect to both surfaces, then the flow proceeds to a step 1306.

In step 1306, if the incoming group of pixels was visible with respect to the first surface, then the flow proceeds to a step 1308. In step 1308, the depth interval of the second surface is set to the merger of the depth intervals of the second surface and the incoming group of pixels. In one embodiment of step 1308, a new maximum depth value of the second surface is set to the greater of the maximum depth value of the incoming group of pixels and the old maximum depth value of the second surface. Similarly, a new minimum depth value of the second surface is set to the lesser of the minimum depth value of the incoming group of pixels and the old minimum depth value of the second surface.

But if, in step 1306, the incoming group of pixels was not visible with respect to the first surface, then the flow proceeds to a step 1310.

In step 1310, if the incoming group of pixels was visible with respect to the second surface, then the flow proceeds to a step 1312. In step 1312, the depth interval of the first surface is set to the merger of the depth intervals of the first surface and the incoming group of pixels. In one embodiment of step 1312, a new maximum depth value of the first surface is set to the greater of the maximum depth value of the incoming group of pixels and the old maximum depth value of the first surface. Similarly, a new minimum depth value of the first surface is set to the lesser of the minimum depth value of the incoming group of pixels and the old minimum depth value of the first surface.

But if, in step 1310, the incoming group of pixels was not visible with respect to the second surface, then the flow proceeds to a step 1314.

In step 1314, if the incoming group of pixels was indeterminate with respect to the first surface, then the flow proceeds to a step 1316. In step 1316, the depth interval of the first surface is set to the merger of the depth intervals of the first surface and the incoming group of pixels. In one embodiment of step 1316, a new maximum depth value of the first surface is set to the greater of the maximum depth value of the incoming group of pixels and the old maximum depth value of the first surface. Similarly, a new minimum depth value of the first surface is set to the lesser of the minimum depth value of the incoming group of pixels and the old minimum depth value of the first surface. After step 1316, the flow proceeds to step 1318.

But if, in step 1314, the incoming group of pixels was not indeterminate with respect to the first surface, then the flow proceeds to a step 1318.

In step 1318, if the incoming group of pixels was indeterminate with respect to the second surface, then the flow proceeds to a step 1320. In step 1320, the depth interval of the second surface is set to the merger of the depth intervals of the second surface and the incoming group of pixels. In one embodiment of step 1320, a new maximum depth value of the second surface is set to the greater of the maximum depth value of the incoming group of pixels and the old maximum depth value of the second surface. Similarly, a new minimum depth value of the second surface is set to the lesser of the minimum depth value of the incoming group of pixels and the old minimum depth value of the second surface.

Another Embodiment for Determining Visibility

Figure 16:
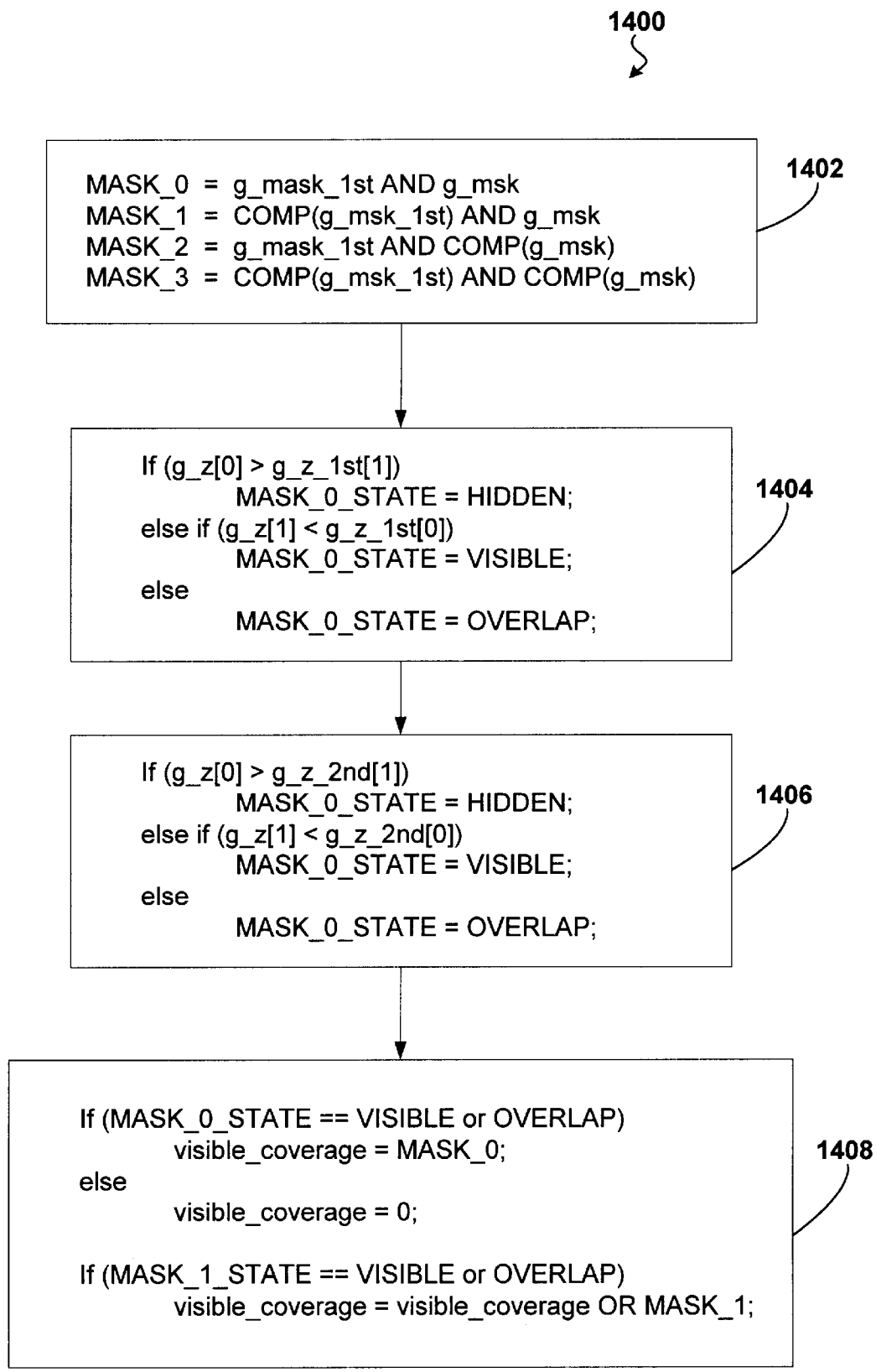
FIG. 16 illustrates a process for determining visibility according to one embodiment of the invention.

FIG. 16 is a simplified flow diagram illustrating a method for determining group visibility according to another embodiment of the invention. This diagram is used herein for illustrative purposes only and is not intended to limit the scope of the invention. FIG. 16 will be described with reference to illustrative C-language type definitions and instructions. First, the following is a C-language type definition of an object which may be used to implement a group depth buffer cell that includes information regarding two surfaces:

```
COVER_TYPE g_msk_1st;    /* Coverage mask for 1st surface */
DEPTH_TYPE g_z_1st[2];   /* Depth interval for 1st surface */
DEPTH_TYPE g_z_2nd[2];   /* Depth interval for 2nd surface */
};
``` where g_z_1st[0] is the minimum depth of the first surface, g_z_1 st[1] is the maximum depth of the first surface, g_z_2nd[0] is the minimum depth of the second surface, and g_z_2nd[1] is the maximum depth of the second surface. Similarly, the following is a C-language type definition of an object that includes information regarding an incoming group of pixels:

```
struct incoming_group {
    COVER_TYPE g_msk;      /* Coverage mask for incoming*/
                           group of pixels      */
    DEPTH_TYPE g_z[2];     /* Depth interval for incoming*/
                           group of pixels      */
};
``` where g_z[0] is the minimum depth of the incoming group of pixels and g_z[ 1] is the maximum depth of the incoming group of pixels.

In a step 1402, the coverage of the cell is partitioned into four areas corresponding to four coverage masks MASK_0, MASK_1, MASK_2, and MASK_3. In particular, MASK_0 corresponds to the intersection of the coverages of the incoming group of pixels and the first surface. MASK_1 corresponds to the intersection of the coverages of the incoming group of pixels and the second surface. MASK_2 corresponds to the portion of the first surface not intersecting with the incoming group of pixels. And, MASK_3 corresponds to the portion of the second surface not intersecting with the incoming group of pixels. In FIG. 16, "AND" refers to a bit-wise AND operation, and "COMP( )" refers to a bit-wise complement operation. In another embodiment, "COMP(x)" may refer to a function ALL_1_MASK XOR x, where ALL_1_MASK is a coverage mask containing all ones, and "XOR" refers to a bit-wise exclusive-OR operation.

In a step 1404, the group visibility of the incoming group of pixels is determined with respect to the first surface. In particular, if the minimum depth of the incoming group of pixels is greater than the maximum depth of the first surface, then a MASK_0_STATE variable is set to a value HIDDEN. On the other hand, if the maximum depth of the incoming group of pixels is less than the minimum depth of the first surface, then the MASK_0_STATE variable is set to a value VISIBLE. Otherwise, the MASK_0_STATE variable is set to a value OVERLAP.

In a step 1406, the group visibility of the incoming group of pixels is similarly determined with respect to the second surface. In particular, if the minimum depth of the incoming group of pixels is greater than the maximum depth of the second surface, then a MASK_1_STATE variable is set to the value HIDDEN. On the other hand, if the maximum depth of the incoming group of pixels is less than the minimum depth of the second surface, then the MASK_1_STATE variable is set to the value VISIBLE. Otherwise, the MASK_1_STATE variable is set to the value OVERLAP.

Next, in a step 1408, a coverage of the pixels in the incoming group that are not hidden is determined. In particular, a variable visible_coverage is set to MASK_0 if MASK_0_STATE is the value VISIBLE or OVERLAP. Otherwise, visible_coverage is set to 0. Next, if MASK_1_STATE is the value VISIBLE or OVERLAP, then the variable visible_coverage is additionally bit-wise ORed with MASK_1. If the variable visible_coverage is zero, then the incoming pixel group is hidden, and thus need not be rendered. Otherwise, there are at least some pixels, identified by the visible coverage mask, that may be visible.

Modifying Depth Interval and Coverage Information

Figure 17:
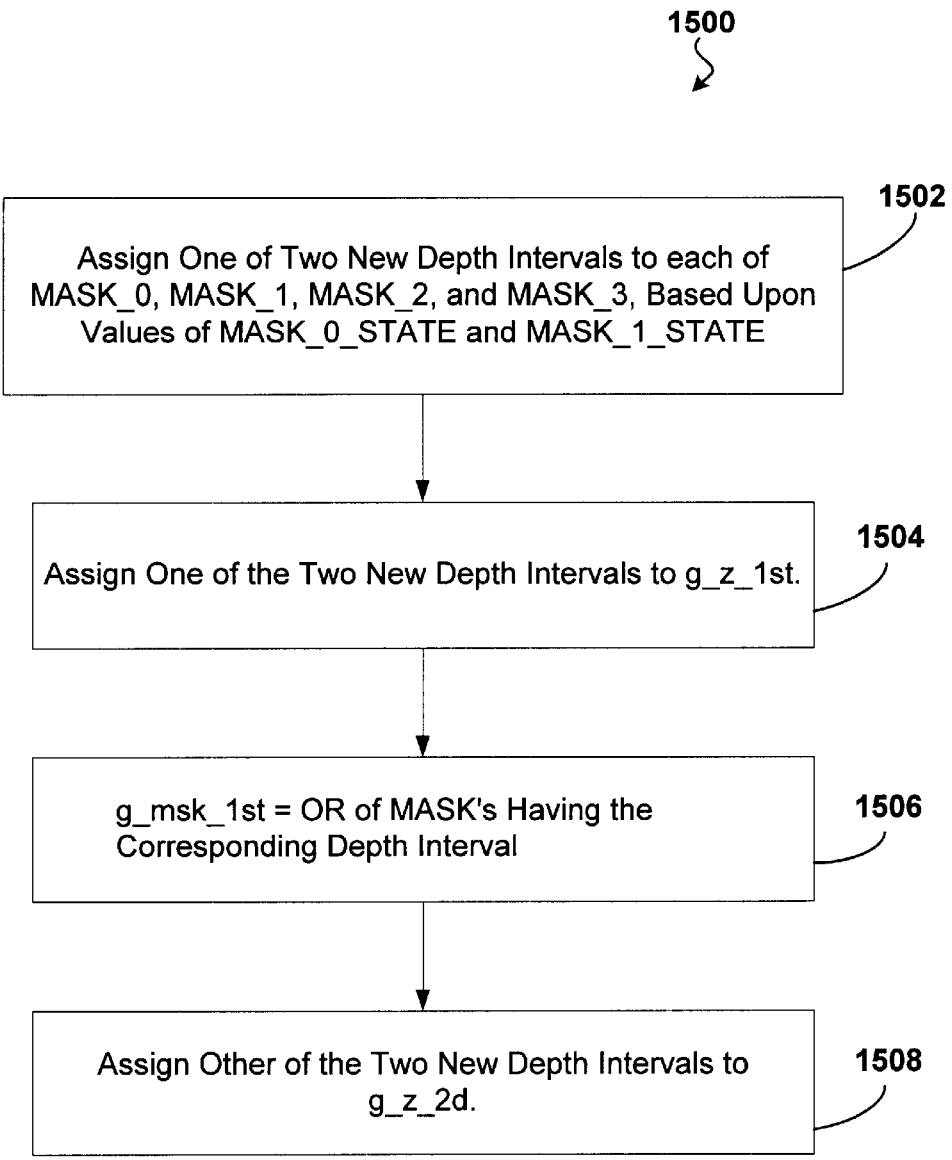
FIG. 17 illustrates a process for modifying depth interval and coverage information for the two surfaces according to one embodiment of the invention.

FIG. 17 is a simplified flow diagram illustrating a process, according to another embodiment of the invention, for modifying depth interval and coverage information for the two surfaces. This diagram is used herein for illustrative purposes only and is not intended to limit the scope of the invention. First, in a step 1502, each of the masks MASK_0, MASK_I, MASK_2, and MASK_3 is assigned one of two depth intervals. The two depth intervals are determined based on the values of MASK_0_STATE and MASK_1_STATE, which may be determined as discussed above with respect to FIG. 16.

FIG. 18 shows one embodiment of a process for determining two depth intervals based on the values MASK_0_STATE and MASK_1_STATE. In particular, FIG. 18 illustrates tables and C-language type instructions for determining two depth intervals based on the values MASK_0_STATE and MASK_1_STATE, as well as other parameters, where:

--- intv 0 intv_0 = g_z;

intv 1 intv_1 = g_z_1st;

intv 2 intv_2 = g_z_2nd;

intv 3 if(MASK_3 == 0)
        intv_3 = g_z_1st;
    else if(MASK_2 == 0)
        intv_3 = g_z_2nd;
    else
        intv_3 = MERGE(g_z_1st, g_z_2nd);

intv 4 if(MASK_0 == 0)
        intv_4 = g_z_1st;
    else
        intv_4 = MERGE(g_z, g_z_1st);

intv 5 if(MASK_1 == 0)
        intv_5 = g_z_2nd;
    else
        intv_5 = MERGE(g_z, g_z_2nd);

intv 6 if(COMP(g_msk_1st) == 0)
        intv_6 = g_z;
    else
        intv_6 = MERGE(g_z, g_z_2nd);

intv 7 if(g_msk_1st == 0)
        intv_7 = g_z[2];
    else
        intv_7 = MERGE(g_z, g_z_1st);

intv 8 if(MASK_2 == 0)
        intv_8 = g_z;
    else if(MASK_0 == 0)
        intv_8 = g_z_1st;

intv 9 if(MASK_3 == 0)
        intv_9 = g_z;
    else if(MASK_1 == 0)
        intv_9 = g_z_2nd.

---

Referring again to FIG. 17, in a step 1504, one of the two new depth intervals is assigned to the depth interval for the first surface (i.e. g_z 1st). In one embodiment, g_z_1st is set to the depth interval assigned to MASK_0. Then, in a step 1506, the coverage mask for the first surface is set to the bit-wise OR of each of the MASK_0, MASK_1, MASK_2, and MASK_3 assigned the same depth interval as that of the value of g_z_1st set in step 1504. Next, in a step 1508, the other of the two new depth intervals is assigned to the depth interval for the second surface (i.e. g_z_2nd).

The above described embodiments for determining group visibility has been described for the case in which the z compare operator calls for a smaller (closer) z value to override a larger (farther) z value. One skilled in the art will understand that the above embodiments can be easily modified for the case in which the z compare operator requires a larger (farther) z value to override a smaller (closer) z value. Additionally, unlike the hierarchical z-buffer method, the above described embodiments may be easily modified so that the depth compare operator may be arbitrarily changed during the display of 3-D images.

A System For Determining Visibility

Figure 19:
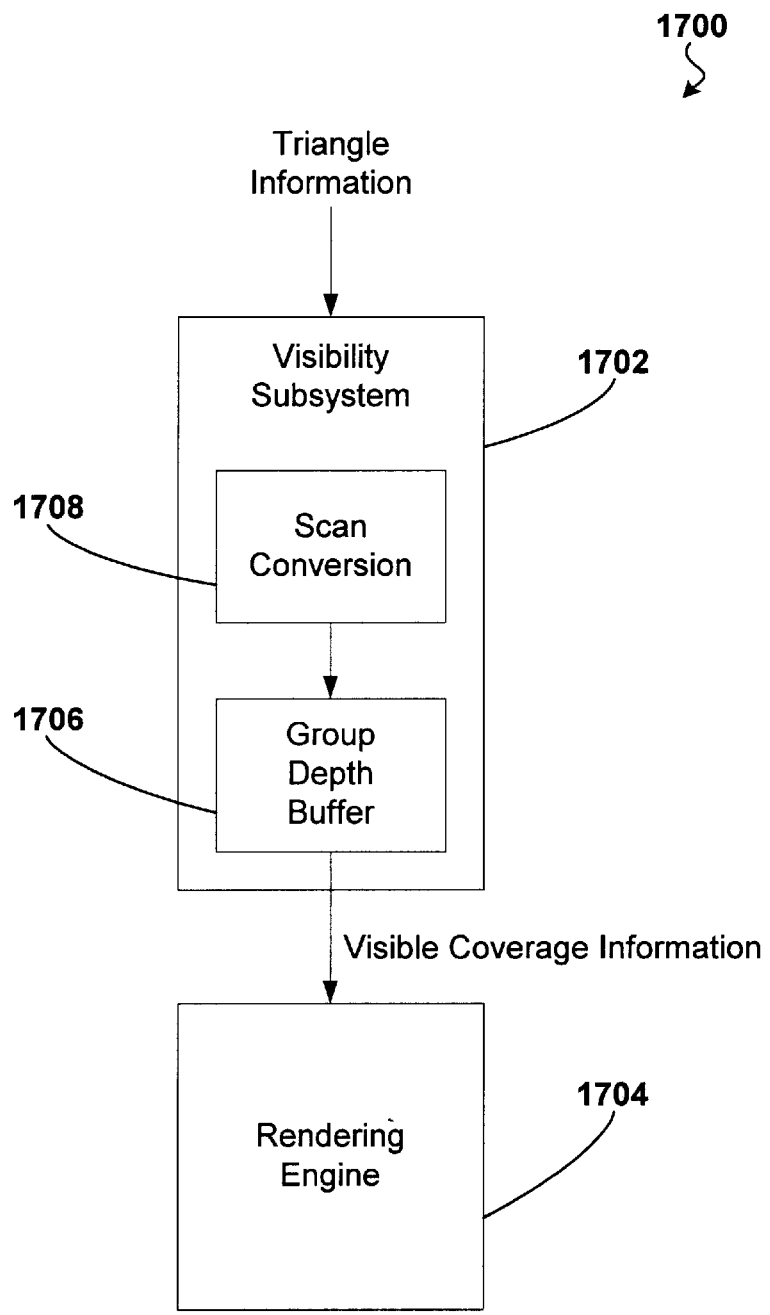
FIG. 19 illustrates a portion of a computer graphics system.

FIG. 19 is a simplified block diagram illustrating a portion of a computer graphics system according to an embodiment of the invention. This diagram is used herein for illustrative purposes only and is not intended to limit the scope of the invention. The portion of the computer graphics system illustrated includes a visibility subsystem 1702 coupled with a rendering engine 1704. The visibility subsystem 1702 receives information corresponding to triangles, and determines the group visibility of groups of pixels that make up the triangle. Then, the visibility subsystem 1702 generates visible coverage information corresponding to the triangles, and provides the visible coverage information to the rendering engine 1704. In one embodiment, the visibility subsystem 1702 provides to the rendering engine 1704 a coverage mask or masks that identify the anti-aliasing sub-pixels in a triangle that are visible or that may be visible. In another embodiment, the visibility subsystem 1702 provides to the rendering engine 1704 a coverage mask or masks that identify the anti-aliasing sub-pixels in a triangle that are visible, and another coverage mask or masks that identify the anti-aliasing sub-pixels in a triangle that may be visible.

The rendering engine 1704 uses the visible coverage information to identify portions of the triangles that need to, or may need to, be rendered. The rendering engine 1704 includes a pixel processor (not shown) that makes a final determination as to visibility of pixels that the visibility subsystem 1702 identified as possibly visible. The pixel processor may determine visibility using any of various methods known to those skilled in the art.

The visibility subsystem 1702 includes a group depth buffer 1706, which includes a plurality of group depth buffer cells as described previously. Additionally, the visibility subsystem 1702 includes a scan converter 1708. The scan converter 1708 receives information corresponding to triangles, and processes the information for use by the group depth buffer 1706. In some embodiments, the triangle information includes vertices of triangles in, for example, X, Y, Z coordinates. Referring again to FIG. 1, the triangle information may be received from the graphics memory 116 via the memory controller 114. Referring to FIG. 2, the scan converter 1708 partitions triangle information into a plurality of groups corresponding to each of the cells 154 in which the triangle has coverage. In one embodiment, the scan converter 1708 creates a data structure for each of the cells 154 in which the triangle has coverage, where the data structure includes depth interval and coverage information for the triangle in the corresponding cell 154. In some embodiments, the scan converter 1708 may determine depth intervals according to methods described with respect to FIGS. 5 and 6.

Because the group depth buffer 1706, operating according to the invention, determines group visibility of groups of pixels using depth interval comparisons, the group depth buffer 1706 provides a high throughput at a relatively low cost in terms of processing power. It also takes much less on-chip storage to cache a fixed portion of the screen area in order to reduce the bandwidth required for external memory accesses, as compared to the traditional z-buffer and hierarchical z-buffer schemes. Additionally, the group depth buffer is easily implemented in hardware, as opposed to hierarchical z-buffer techniques. Also, the group depth buffer can more easily accommodate stenciling because stencil value may be incorporated into the group depth buffer data structure. Moreover, it has been found that the group depth buffer 1706 identifies a large percentage of pixels that need not be rendered because they are hidden. Thus, the rendering engine is required to process less pixels and its throughput requirements can be greatly reduced. Therefore, the present invention reduces the costs of the computer graphic system without sacrificing quality.

It is to be understood that the various functional blocks in the visibility subsystem 1702 may be implemented by a combination of hardware and/or software, and that in specific implementations some or all of the functionality of some of the blocks may be combined.

The invention has now been explained with reference to specific embodiments. Other embodiments will be apparent to those of ordinary skill in the art. Therefore it is not intended that this invention be limited except as indicated by the appended claims.

What is claimed is:

1. A method for determining visibility of groups of pixels performed by a computer graphics system, the method comprising:

partitioning a display into a plurality of cells, wherein each of the plurality of cells includes a depth interval and a coverage for each of a plurality of surfaces having coverage within the each of the plurality of cells;

receiving a depth interval and a coverage for a group of pixels having coverage within one or more of the cells; and for each of the one or more of the cells, determining a visibility of the group of pixels based on comparisons of the depth interval of the group of pixels with the depth intervals of the plurality of surfaces.

2. The method of claim 1 further comprising modifying the depth interval and the coverage of each of the plurality of surfaces based on the depth interval and coverage of the group of pixels.

3. The method of claim 1 wherein the group of pixels includes anti-aliasing sub-pixels.

4. The method of claim 1, wherein the determining step includes comparing a minimum depth of the group of pixels with a maximum depth of a surface.

5. The method of claim 1, wherein the determining step includes comparing a maximum depth of the group of pixels with a minimum depth of a surface.

6. The method of claim 1 wherein the determining step includes, for each of the plurality of surfaces, determining whether the group of pixels is hidden with respect to the each of the plurality of surfaces.

7. The method of claim 1 wherein the determining step includes, for each of the plurality of surfaces, determining whether the group of pixels is visible with respect to the each of the plurality of surfaces.

8. The method of claim 1 wherein the determining step includes, for each of the plurality of surfaces, determining whether visibility of the group of pixels is indeterminate with respect to the each of the plurality of surfaces.

9. The method of claim 1 further comprising partitioning the group of pixels into a plurality of sub-groups, wherein each sub-group has a coverage comprising an intersection of the coverage of the group of pixels with the coverage of one of the plurality of surfaces, and wherein the determining step includes determining a visibility of each of the sub-groups based on comparisons of the depth interval of the group of pixels with the depth intervals of the plurality of surfaces.

10. The method of claim 1 wherein each cell corresponds to a rectangular group of pixels on the display, said rectangular group having a height and a width.

11. The method of claim 10 wherein the rectangular groups each have a same height and a same width.

12. A visibility subsystem in a computer graphics system for determining visibility of groups of pixels, the visibility subsystem comprising:

a group depth buffer having a plurality of group depth buffer cells, each group depth buffer cell corresponding to a display region of a display;

wherein each group depth buffer cell is configured to receive a depth interval of a group of pixels within the corresponding display region and a coverage of the group of pixels within the corresponding display region, and to generate a visibility coverage of the group of pixels within the corresponding display region.

13. The visibility subsystem of claim 12 further comprising a scan converter coupled to the group depth buffer, the scan converter configured to generate, for each of the display regions in which the group of pixels has coverage, a depth interval of the group of pixels within the display region and a coverage of the group of pixels within the display region.

14. The visibility subsystem of claim 12 wherein each group depth buffer cell includes a depth interval and a coverage for each of a plurality of surfaces; and wherein each group depth buffer cell is further configured to generate the visibility coverage of the group of pixels within the corresponding display region based on comparisons of the coverage of the group of pixels within the corresponding display region with the coverages of the surfaces and based on comparisons of the depth interval of the group of pixels within the corresponding display region with the depth intervals of the surfaces.

15. The visibility subsystem of claim 14 wherein each group depth buffer cell is further configured to modify the depth intervals and the coverages of the surfaces based on the coverage of the group of pixels within the corresponding display region and based on the depth interval of the group of pixels within the corresponding display region.

16. The visibility subsystem of claim 14 wherein each group depth buffer cell is further configured to generate the visibility coverage of the group of pixels within the corresponding display region based on comparisons of a minimum depth of the group of pixels within the corresponding display region with maximum depths of the surfaces.

17. The visibility subsystem of claim 14 wherein each group depth buffer cell is further configured to generate the visibility coverage of the group of pixels within the corresponding display region based on comparisons of a maximum depth of the group of pixels within the corresponding display region with minimum depths of the surfaces.

18. The visibility subsystem of claim 12 wherein the group of pixels includes anti-aliasing sub-pixels and wherein the coverage of the group of pixels includes sub-pixel coverage.

19. The visibility subsystem of claim 12 wherein the generated visibility coverage of the group of pixels includes a coverage of pixels that are not hidden.

20. The visibility subsystem of claim 12 wherein the generated visibility coverage of the group of pixels includes a coverage of pixels that are visible.

21. A computer system for processing graphics data, comprising:

a visibility subsystem coupled to a memory, the visibility subsystem including a scan converter coupled to a group depth buffer, the group depth buffer having a plurality of group depth buffer cells corresponding to a plurality of regions of a display, the visibility subsystem configured to generate visibility coverages of groups of pixels; and a rendering engine coupled to the visibility subsystem and the memory, the rendering engine configured to receive visibility coverages of the groups of pixels and to render visible portions of the group of pixels.

22. The computer system of claim 21 wherein the scan converter is configured to generate, for each of the groups of pixels, a depth interval and a coverage of the each of the groups of pixels for each of the regions in which the each of the groups of pixels has coverage.

23. The computer system of claim 22 wherein each of the group depth buffer cells is configured to receive, from the scan converter, the depth interval and the coverage of the each group of pixels, and to determine a visibility coverage of the group of pixels within the corresponding display region.

24. A method performed by a computer graphics system of determining a depth interval of a group of pixels within a region, the method comprising:

determining a depth of the group of pixels at a center of the region;

determining a bound on a positive change in depth of the group of pixels from the center of the region to any pixel of the group of pixels within the region;

determining a first endpoint of the depth interval based on the sum of the depth of the group of pixels at the center of the region with the bound on the positive change in depth;

determining a bound on a negative change in depth of the group of pixels from the center of the region to any pixel of the group of pixels within the region; and determining a second endpoint of the depth interval based on the subtraction of the bound on the negative change in depth from the depth of the group of pixels at the center of the region.

25. The method of claim 24 wherein determining a bound on a positive change in depth includes determining a bound on an absolute value of a change in depth of the group of pixels from the center of the region to any pixel of the group of pixels within the region.

26. The method of claim 24 wherein determining a bound on a negative change in depth includes determining a bound on an absolute value of a change in depth of the group of pixels from the center of the region to any pixel of the group of pixels within the region.

27. The method of claim 24 wherein the group of pixels is a coplanar surface having a plurality of vertices, each vertex having a depth, the method further comprising:

determining a maximum of the depths of the vertices; and determining a minimum of the depths of the vertices.

28. The method of claim 27 wherein determining the first endpoint of the depth interval is further based on the minimum of the maximum of the depths of the vertices and the sum of the depth of the group of pixels at the center of the region with the bound on the positive change in depth, and wherein determining the second endpoint of the depth interval is further based on the maximum of the minimum of the depths of the vertices and the subtraction of the bound on the negative change in depth from the depth of the group of pixels at the center of the region.

29. The method of claim 24 wherein the group of pixels is coplanar with a plane in x, y, z coordinate space, satisfying the equation $z = ax + by + c$;

wherein the bound on a positive change in depth of the group of pixels and the bound on a negative change in depth of the group of pixels are determined as $\Delta z$, wherein $$\Delta z = \left|\frac{\partial z}{\partial x}\right|\Delta x\_max + \left|\frac{\partial z}{\partial y}\right|\Delta y\_max;$$

wherein $$\frac{\partial z}{\partial x}$$

is a partial derivative of z with respect to x;
wherein $\Delta x\_max$ is the maximum x-coordinate difference between any pixel in the group of pixels within the region and the center of the region
wherein $$\frac{\partial z}{\partial y}$$

is a partial derivative of z with respect to y; and
wherein $\Delta y\_max$ is the maximum y-coordinate difference between any pixel in group of pixels within the region and the center of the region.

30. The method of claim 24 wherein the group of pixels is coplanar with a plane in x, y, z coordinate space, satisfying the equation z=ax+by+c;

wherein the region is rectangular having an x-dimension w and a y-dimension h;
wherein the bound on a positive change in depth of the group of pixels and the bound on a negative change in depth of the group of pixels are determined as $\Delta z$, wherein $$\Delta z = \frac{\left|\frac{\partial z}{\partial x}\right|w + \left|\frac{\partial z}{\partial y}\right|h}{2};$$

wherein $$\frac{\partial z}{\partial x}$$

is a partial derivative of z with respect to x; and
wherein $$\frac{\partial z}{\partial y}$$

is a partial derivative of z with respect to y.

31. The method of claim 24 wherein the group of pixels includes anti-aliasing sub-pixels.

* * * * *